(12) United States Patent
Sommer et al.

(10) Patent No.: US 7,748,769 B2
(45) Date of Patent: Jul. 6, 2010

(54) ARMREST SUBASSEMBLY FOR A MOTOR VEHICLE

(75) Inventors: Uwe Sommer, Effelder (DE); Manfred Stenzel, Bamberg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 871 days.

(21) Appl. No.: 11/517,547

(22) Filed: Sep. 6, 2006

(65) Prior Publication Data

US 2007/0080560 A1 Apr. 12, 2007

(30) Foreign Application Priority Data

Sep. 6, 2005 (DE) ........................ 10 2005 043 063

(51) Int. Cl.
*B60N 3/02* (2006.01)
(52) U.S. Cl. ...................... 296/153; 296/1.09
(58) Field of Classification Search ............... 296/1.09, 296/153; 297/411.21, 411.36
See application file for complete search history.

(56) References Cited

U.S. PATENT DOCUMENTS

| | | | | |
|---|---|---|---|---|
| 2,325,292 A | * | 7/1943 | Westrope | 297/411.21 |
| 2,760,813 A | * | 8/1956 | Colm | 296/68.1 |
| 3,603,637 A | * | 9/1971 | DePinto | 296/153 |
| 4,659,135 A | * | 4/1987 | Johnson | 296/153 |
| 5,803,415 A | * | 9/1998 | Konishi et al. | 248/118 |
| 5,816,645 A | * | 10/1998 | Grimes | 296/153 |
| 5,964,497 A | * | 10/1999 | Wiles | 296/153 |
| 6,554,364 B1 | * | 4/2003 | Dammermann et al. | 297/411.37 |
| 6,769,601 B2 | * | 8/2004 | Haikarainen et al. | 235/87 R |
| 7,144,067 B2 | * | 12/2006 | Gramss | 296/153 |
| 7,484,809 B2 | * | 2/2009 | Hughes | 297/411.22 |
| 7,537,268 B2 | * | 5/2009 | Becker et al. | 296/153 |
| 2004/0164577 A1 | * | 8/2004 | Shabana et al. | 296/1.09 |
| 2007/0085402 A1 | * | 4/2007 | Hu et al. | 297/411.36 |
| 2008/0054676 A1 | * | 3/2008 | Sommer et al. | 296/153 |
| 2008/0309140 A1 | * | 12/2008 | Ho | 297/411.36 |

* cited by examiner

*Primary Examiner*—Glenn Dayoan
*Assistant Examiner*—Gregory Blankenship
(74) *Attorney, Agent, or Firm*—Christie, Parker & Hale, LLP

(57) ABSTRACT

The invention relates to an armrest subassembly for a motor vehicle which is designed and provided for arrangement on the interior side of a motor vehicle body. The armrest subassembly comprising an armrest, an adjusting device, a locking device and armrest-side locking means of the locking device. According to the invention, the armrest-side locking means are coupled to the armrest in such a manner that the locking means can be brought into engagement with and can be disengaged from the locking mechanism by a movement of the armrest with a component perpendicular to the adjustment path.

48 Claims, 27 Drawing Sheets

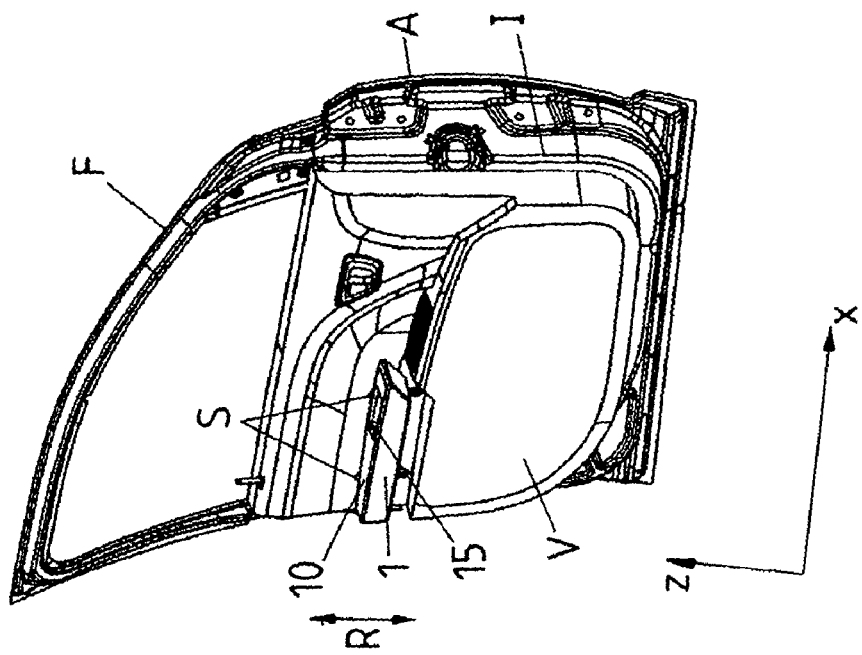
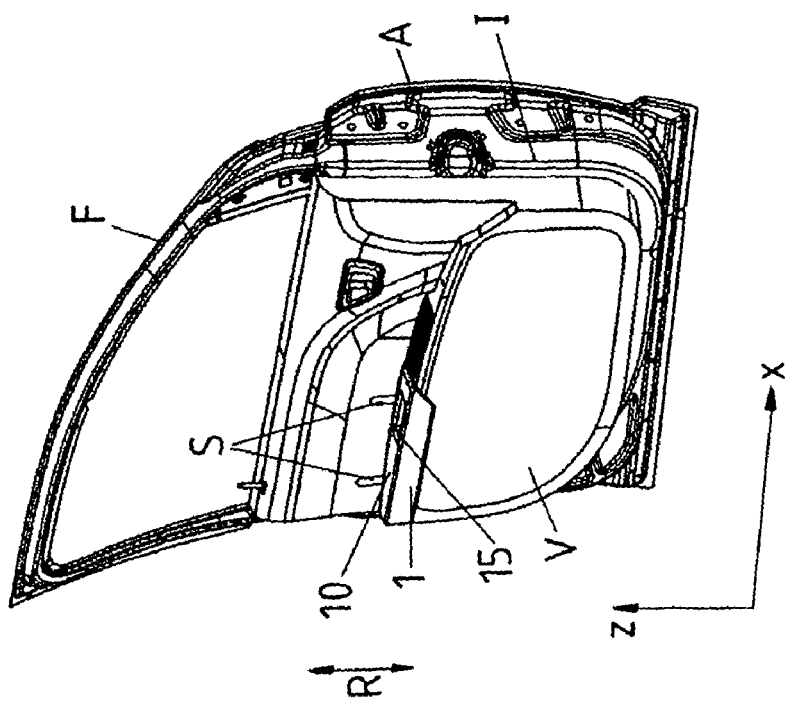

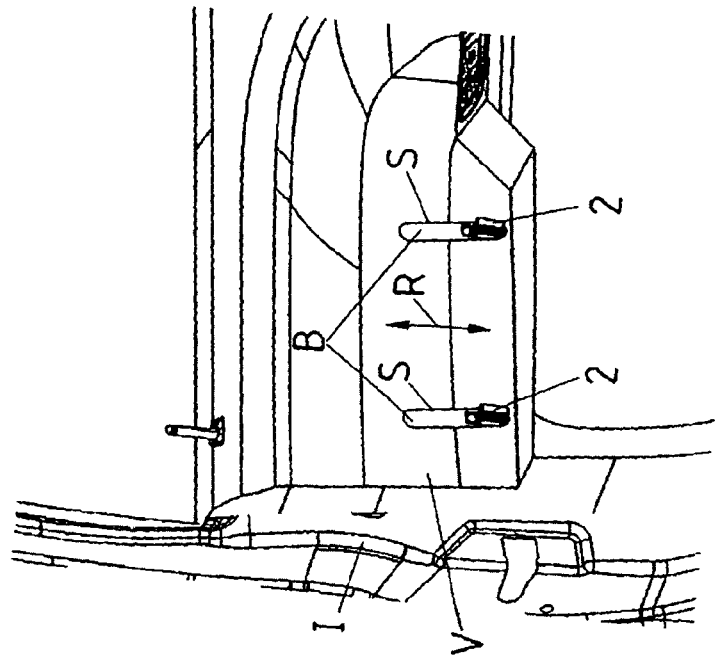
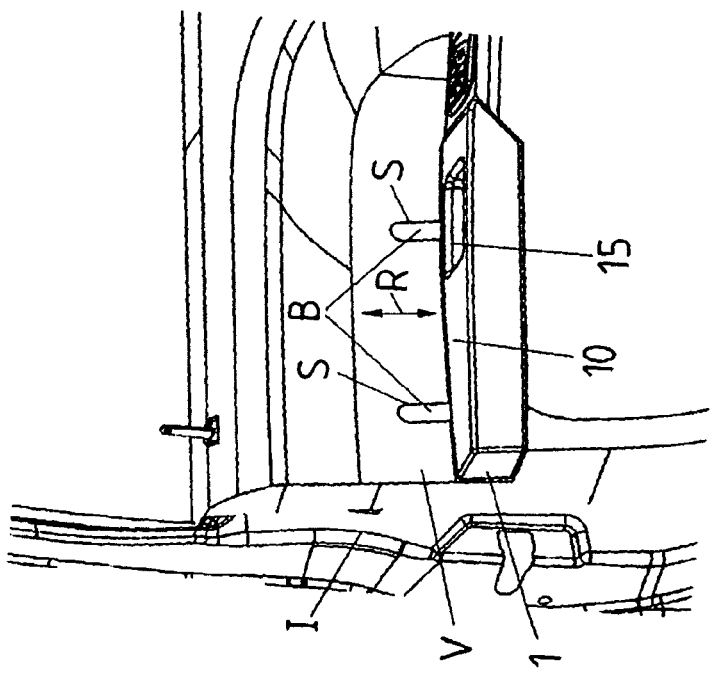
FIG 3A
FIG 3B

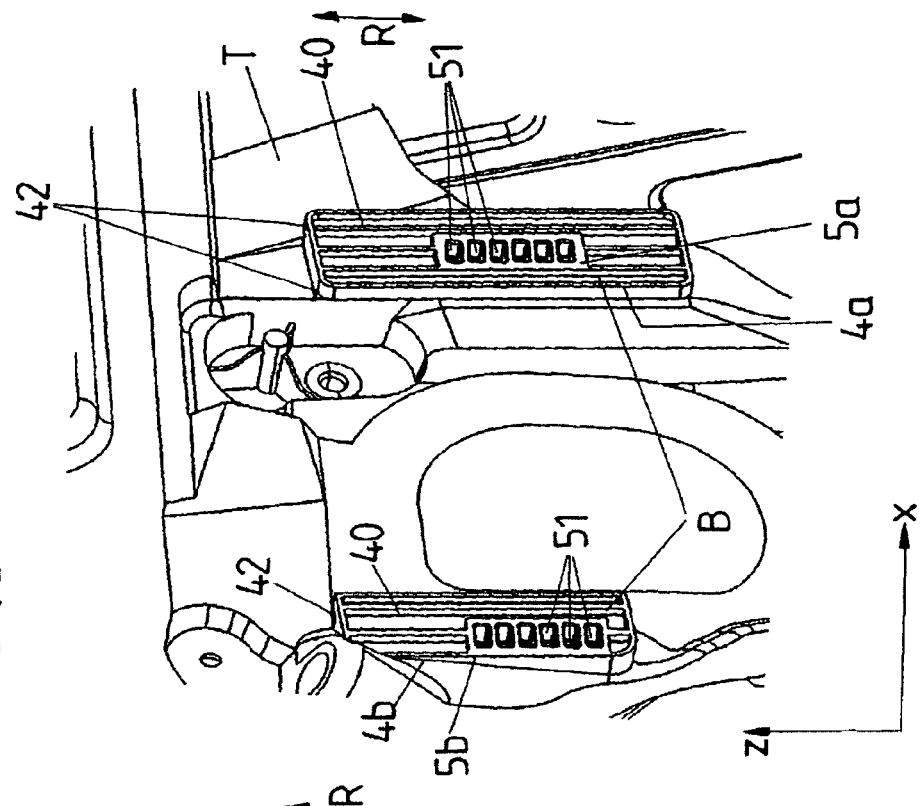
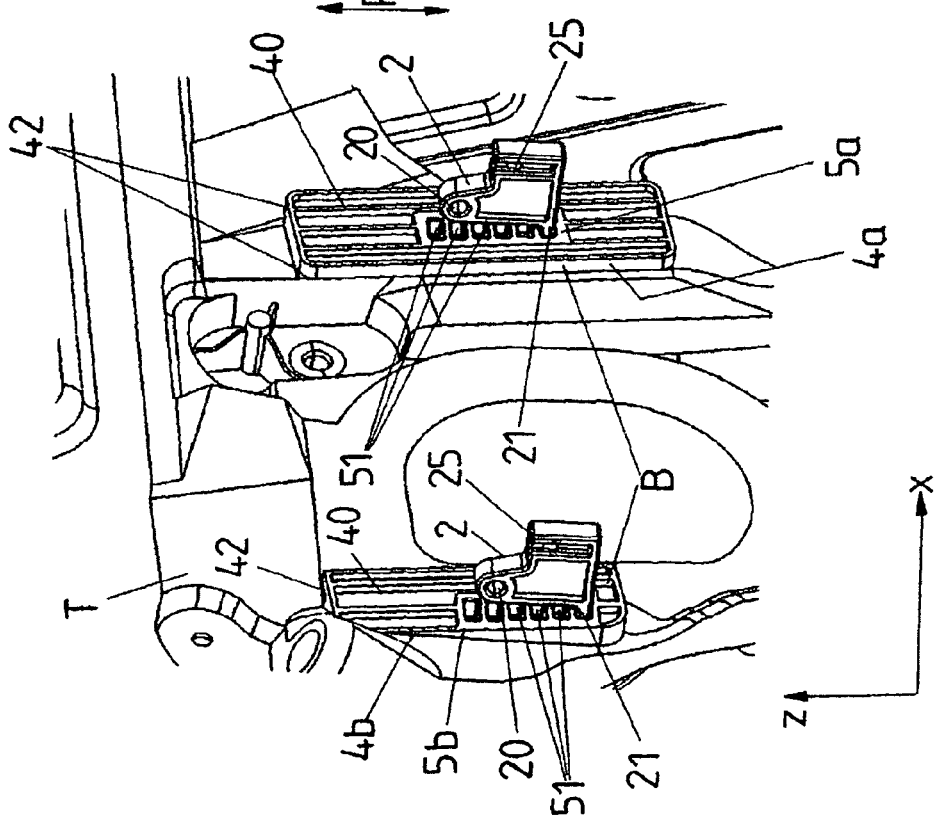

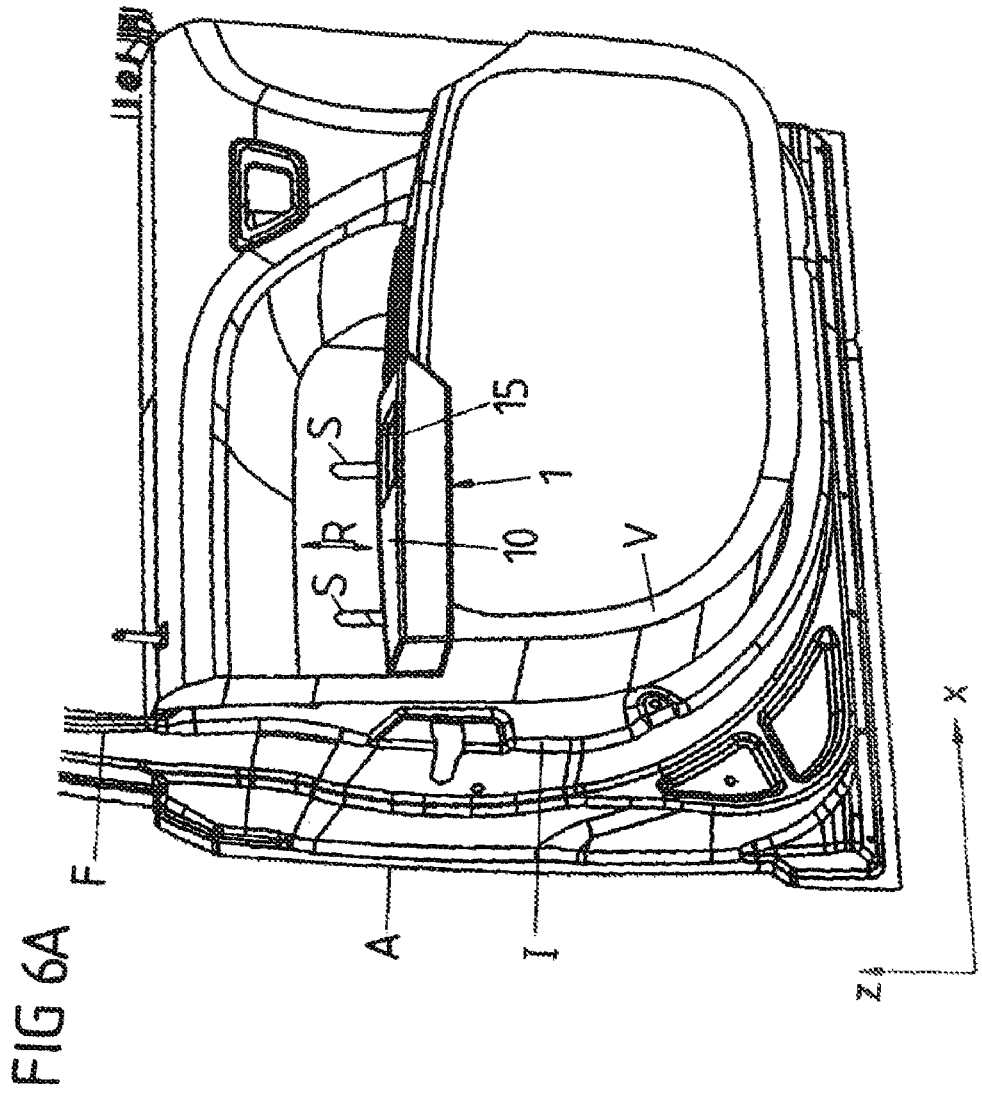

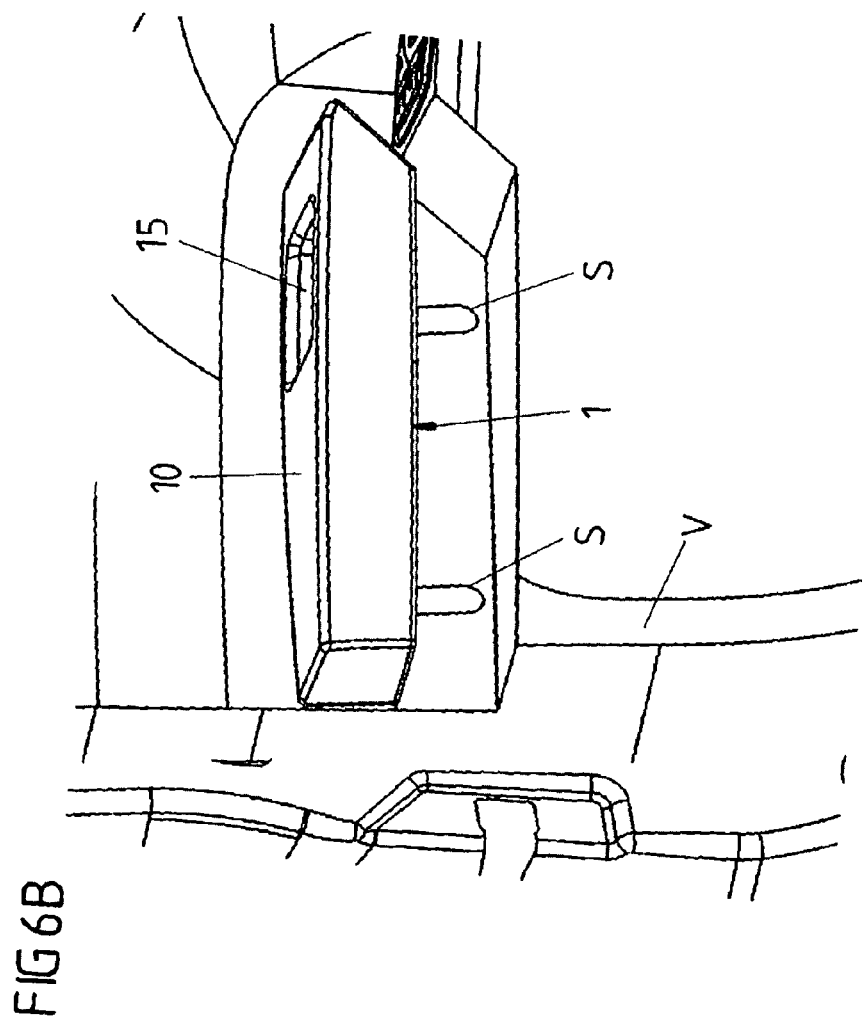

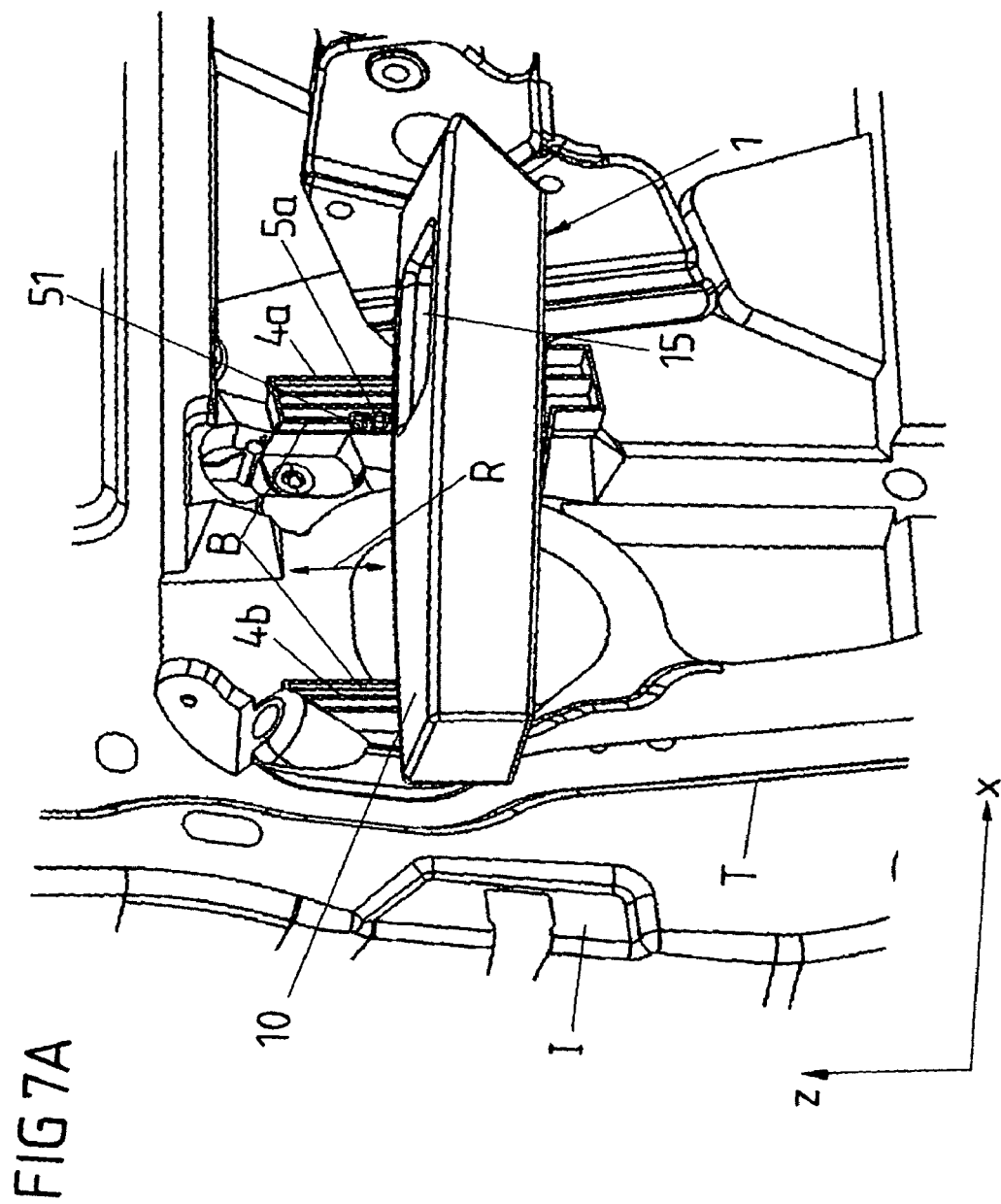

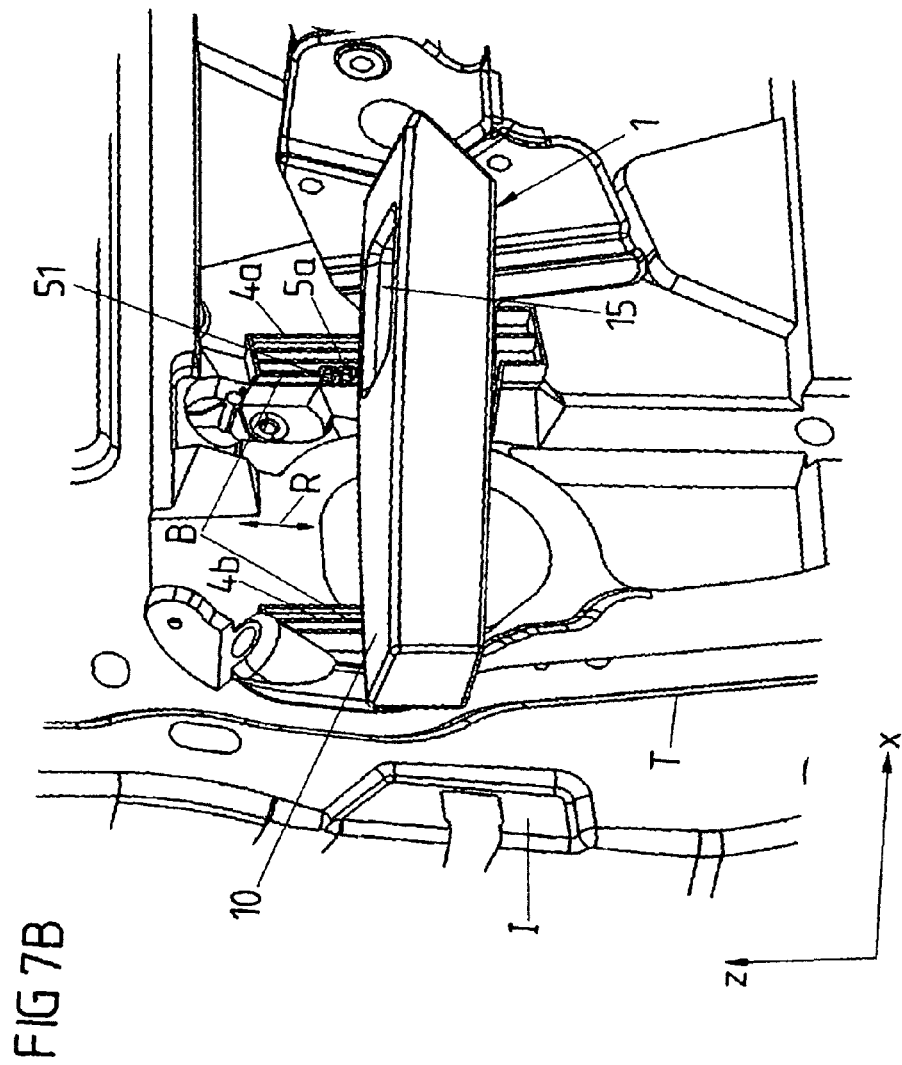

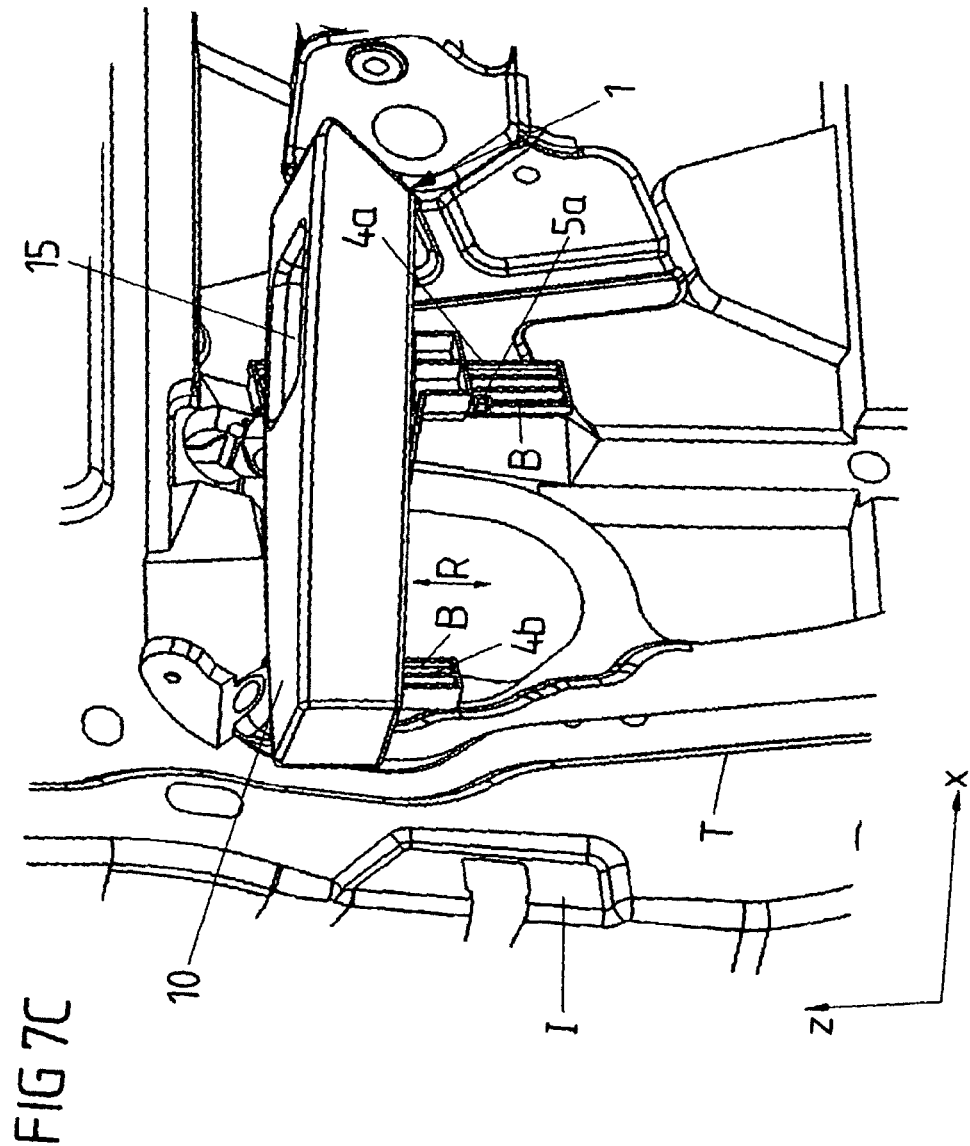

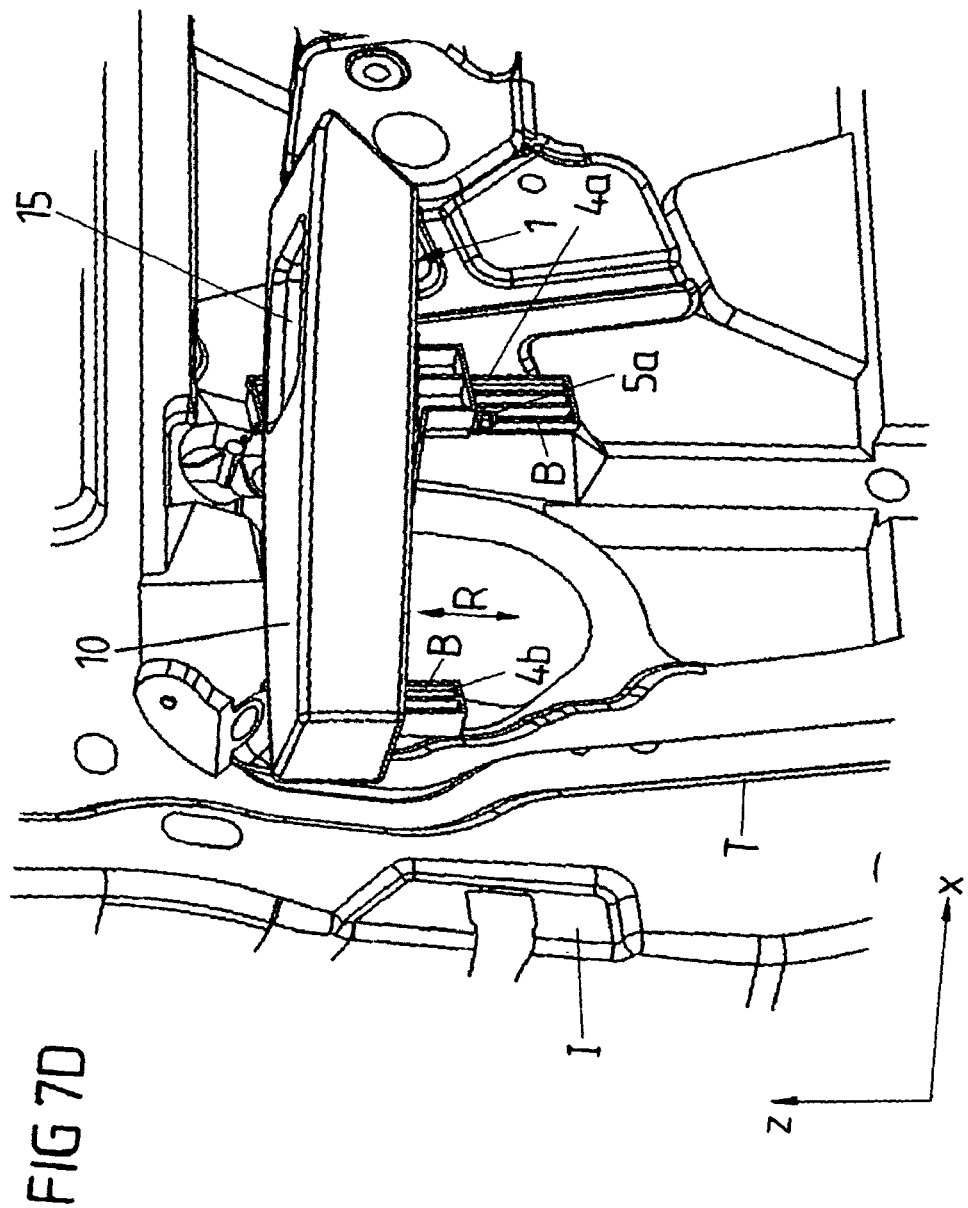

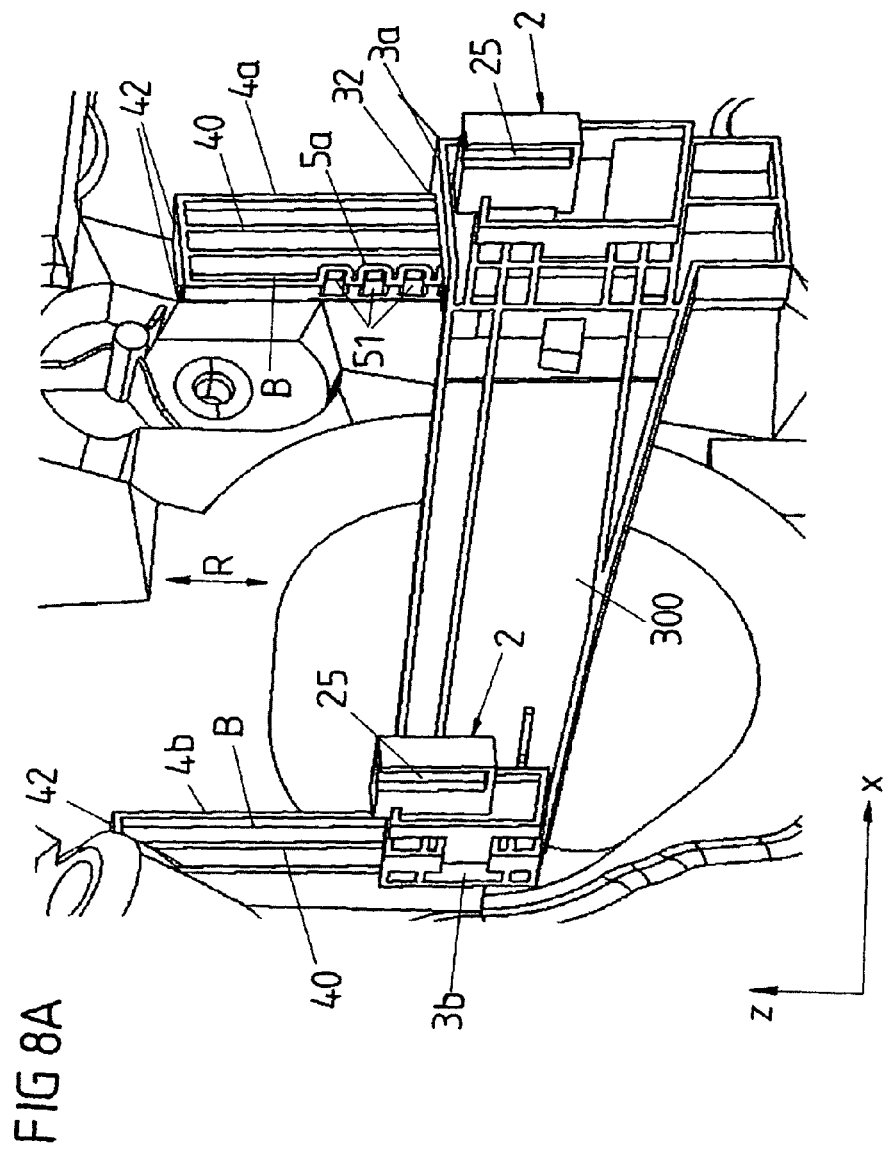

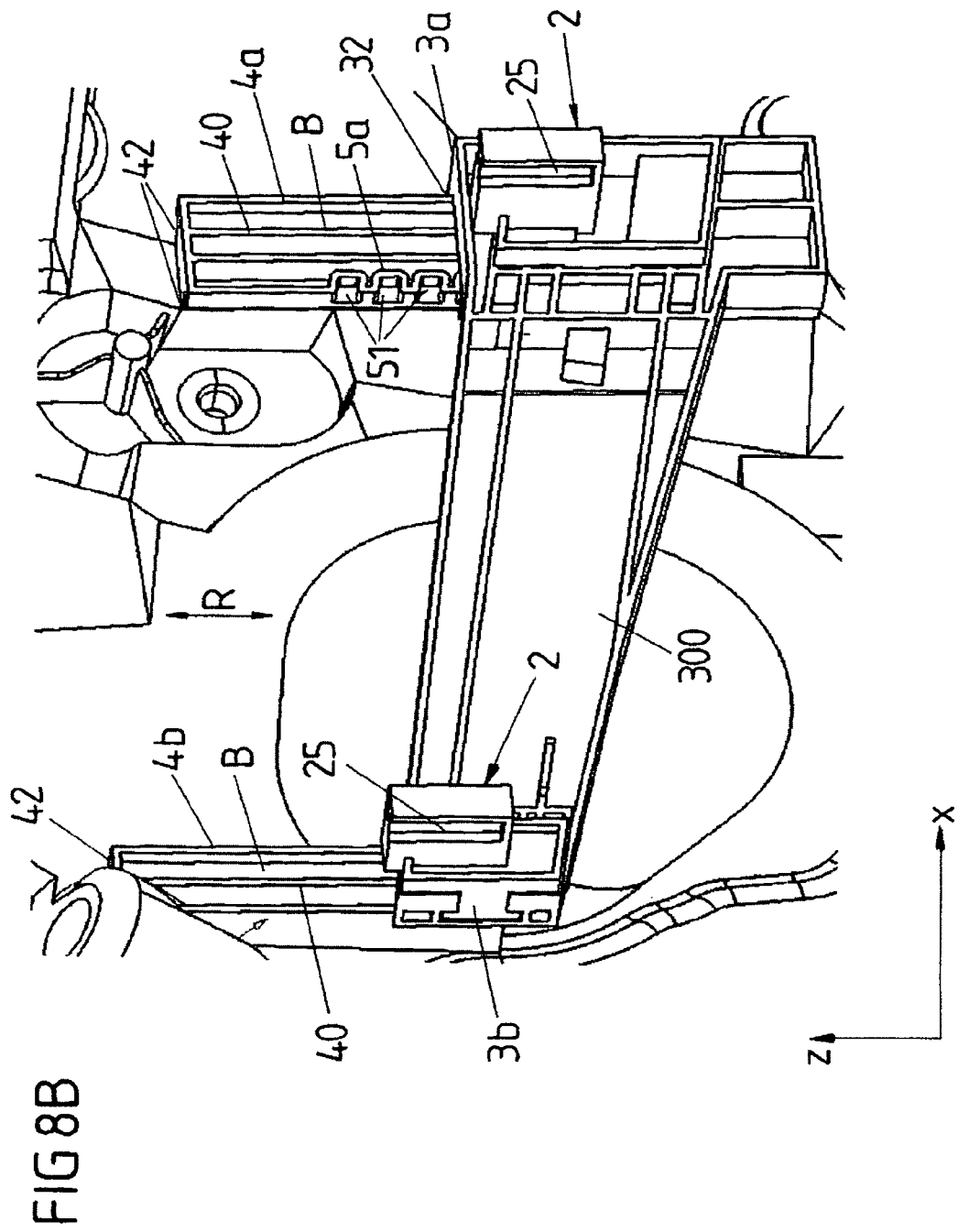

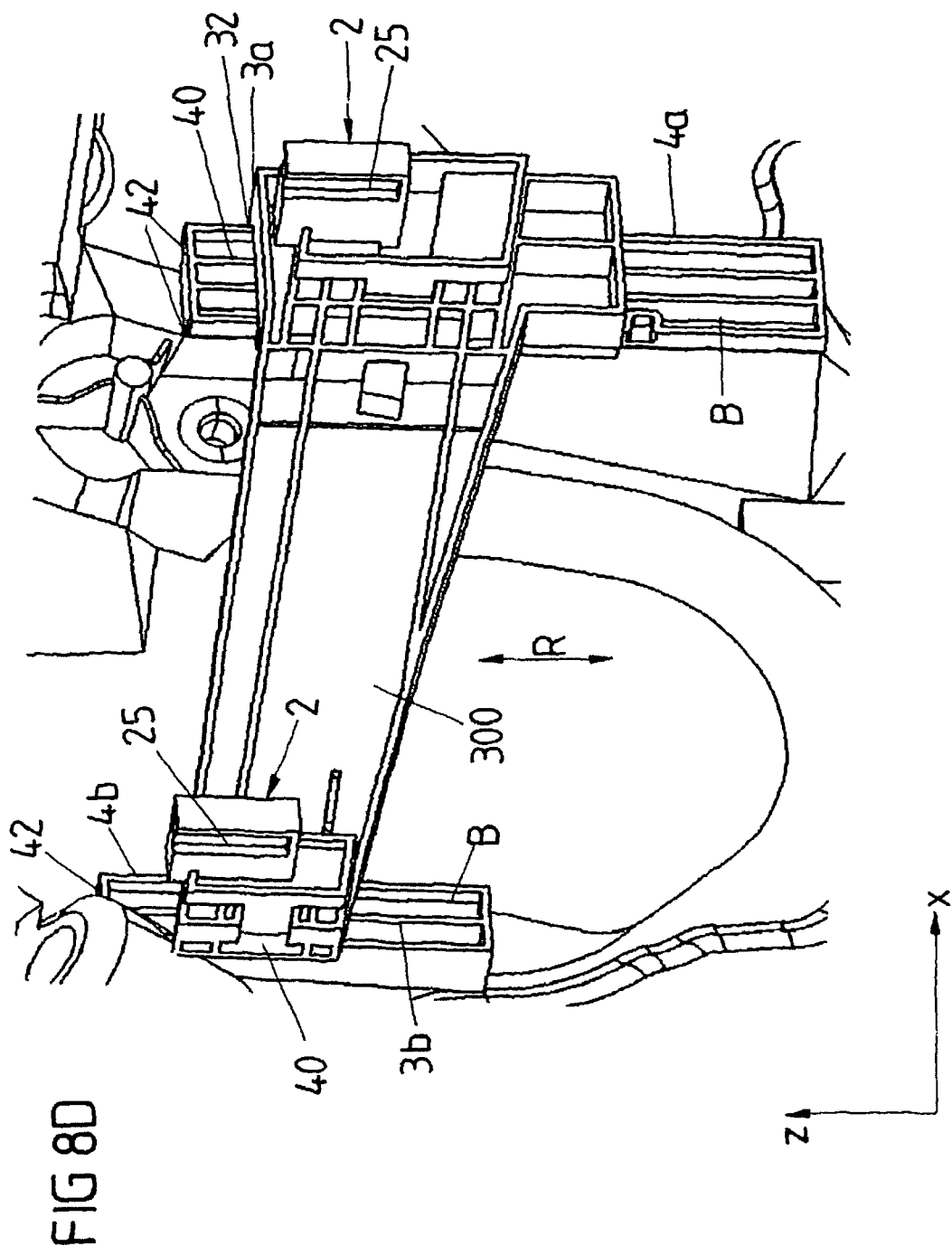

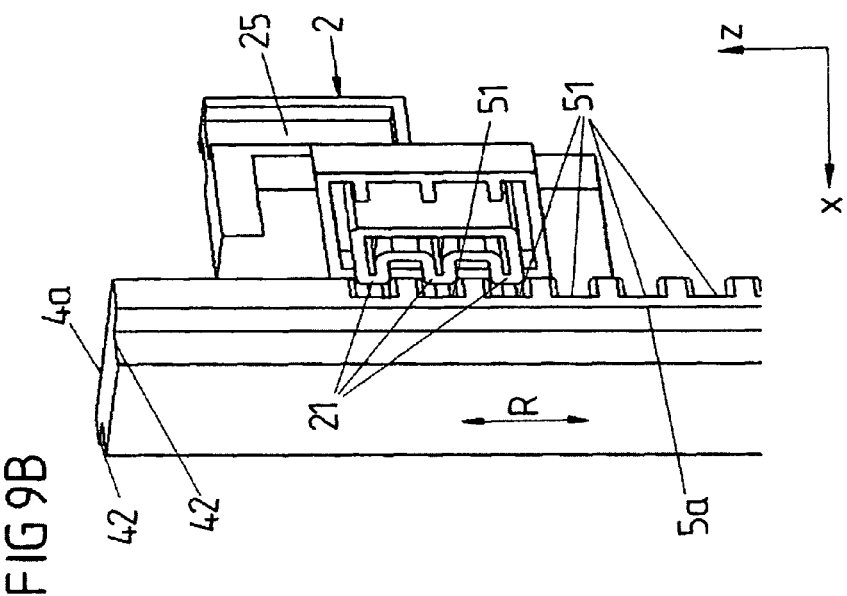
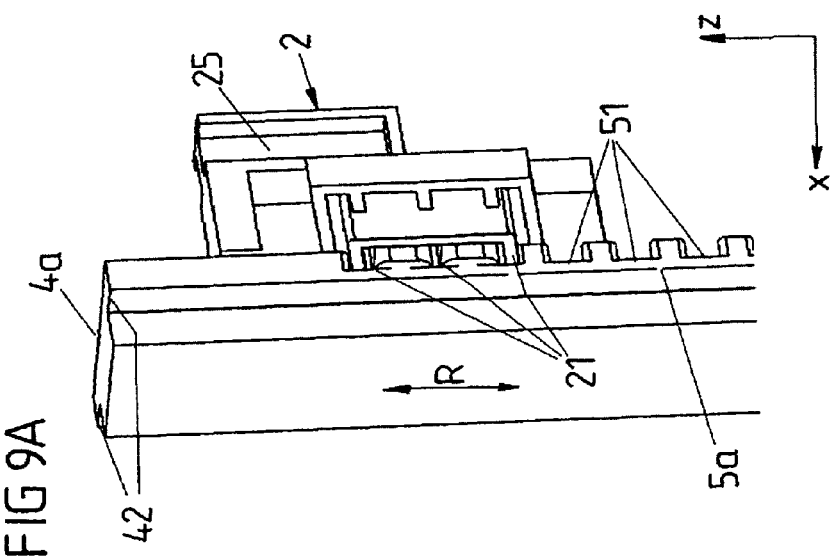

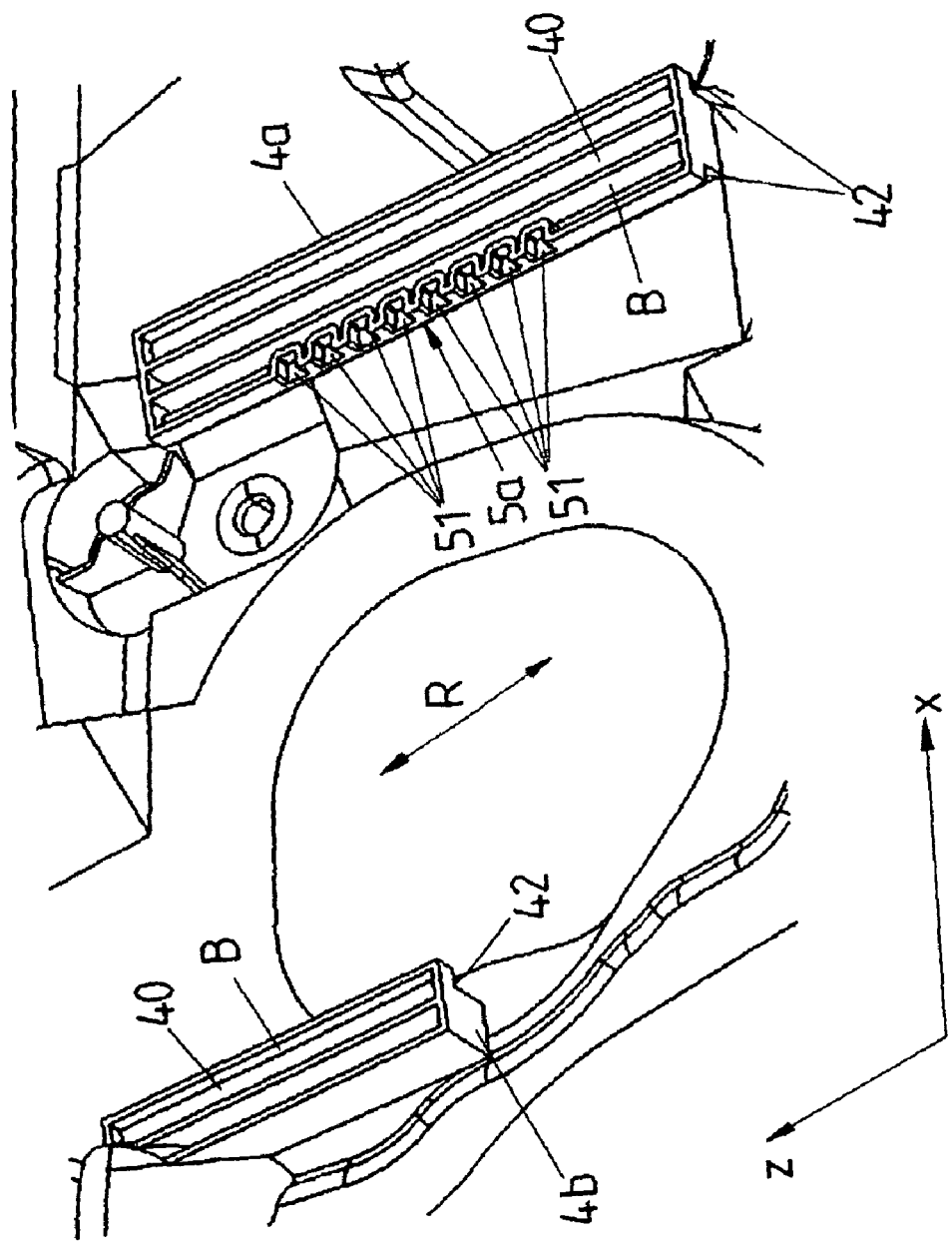

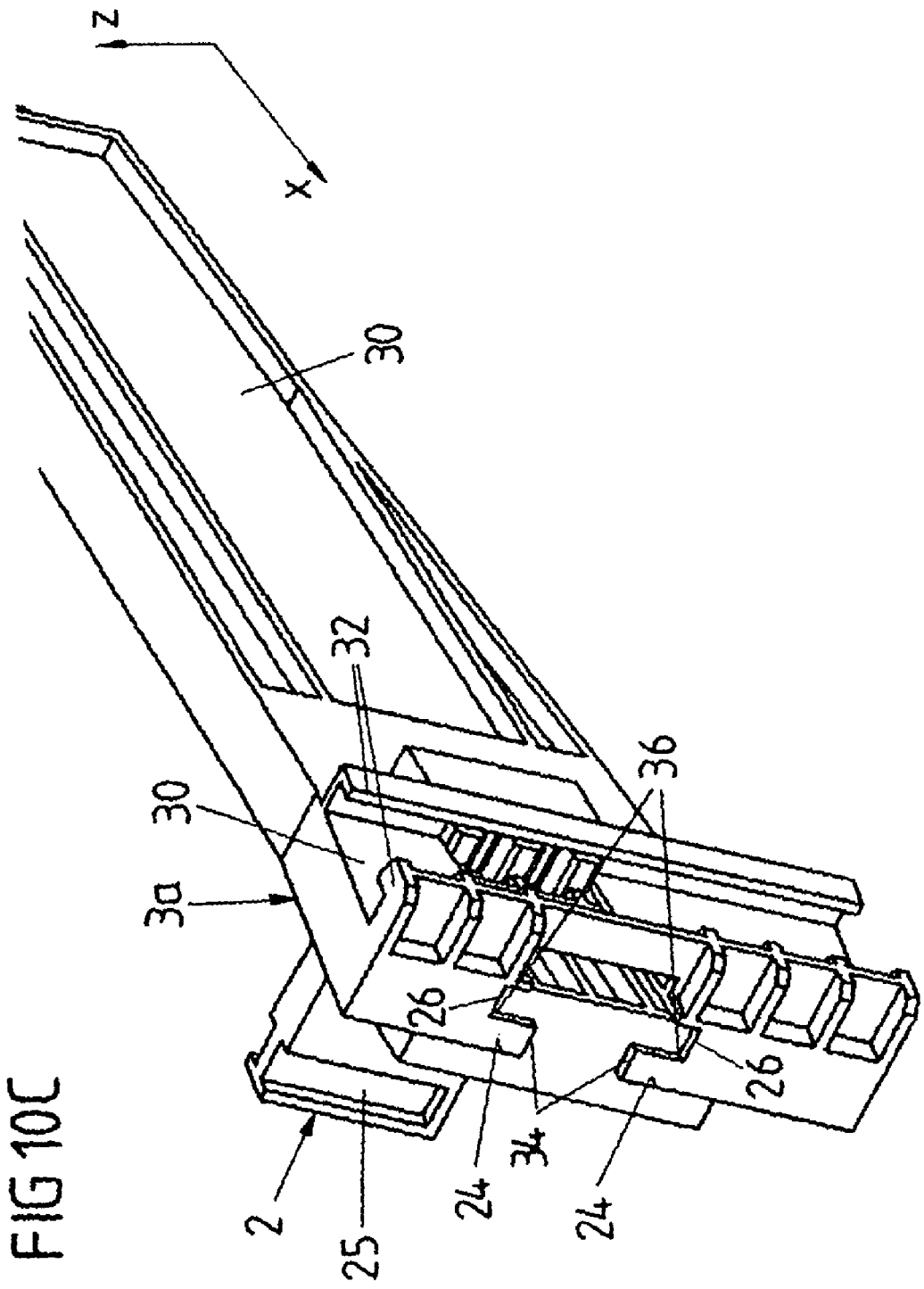

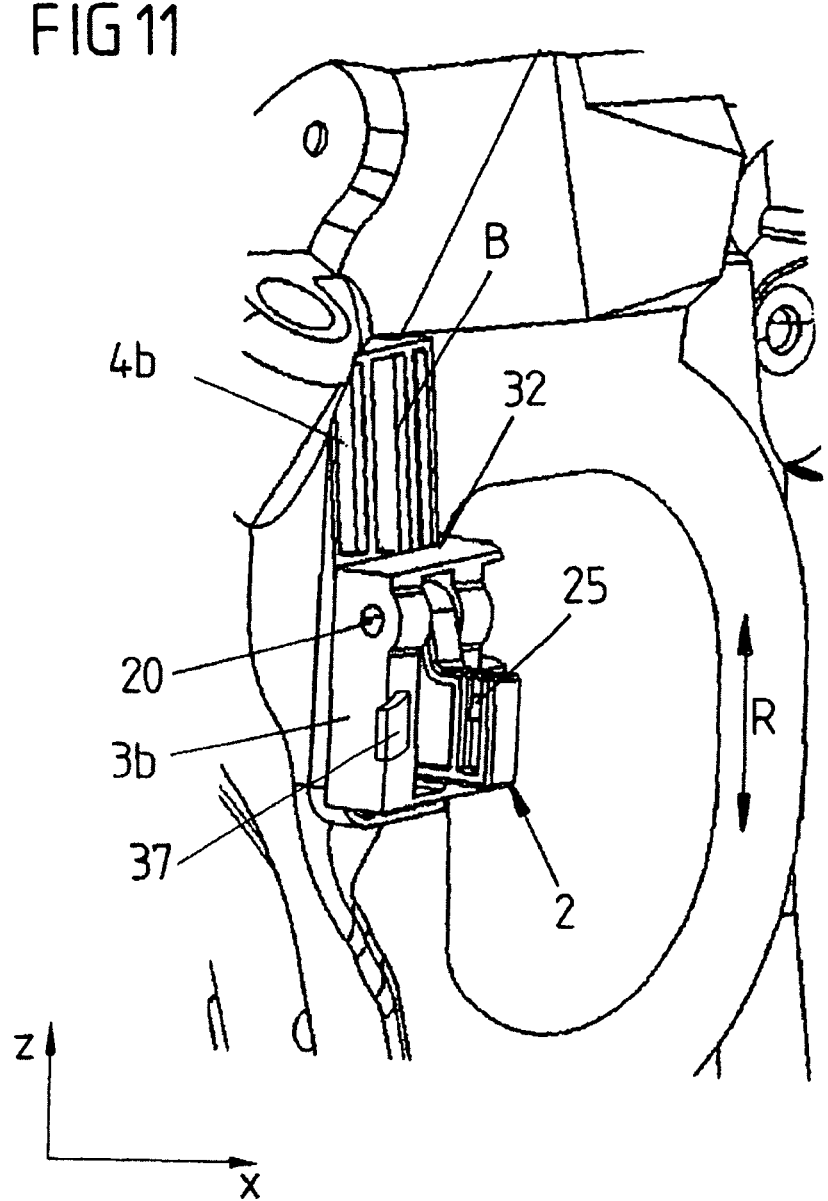
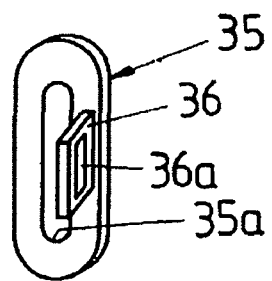

ARMREST SUBASSEMBLY FOR A MOTOR VEHICLE

CROSS-REFERENCE TO RELATED APPLICATIONS

This application claims priority to and the benefit of German Patent Application Number 10 2005 043 063.5, filed on Sep. 06, 2005, which are hereby incorporated by reference.

BACKGROUND OF THE INVENTION

The invention relates to an armrest subassembly for a motor vehicle, which is designed and provided for arrangement on the interior side of a motor vehicle body.

An armrest subassembly of this type comprises an armrest which has an arm support for supporting the forearm of a motor vehicle occupant; an adjusting device with which the position of the armrest can be set along an adjustment path in order to change the armrest position and therefore also the position of the arm support and, by this means, to be able to adapt it to the requirements of vehicle occupants differing in size (comfort adjustment); a locking device with which the armrest can be locked in a previously set armrest position; and armrest-side locking means of the locking device, which can be brought into engagement with an associated body-side locking mechanism, i.e. with body-side locking means to lock the armrest and which can be disengaged from the body-side locking mechanism to unlock the armrest to re-set the armrest position. In this case, the body-side locking mechanism refers to any desired suitable body-side locking means which can be brought into engagement with and can be disengaged from the armrest-side locking means.

The adjustment path of the comfort adjustment, which defines the adjustment direction along which the armrest position can be changed by a movement of the armrest along the adjustment path, usually runs—with reference to the armrest subassembly when installed in a motor vehicle—essentially along the vertical vehicle axis, which corresponds to the possibility of undertaking a "height setting" of the armrest. However, a curved adjustment path may also be provided, with the result that the local adjustment direction changes along the adjustment path.

An armrest subassembly of this type is typically arranged on the interior side of a lateral motor vehicle body, next to a motor vehicle seat situated in the vehicle interior, in order to provide a person on the corresponding seat with the possibility of supporting himself on the armrest, more precisely on the arm support thereof. Armrest subassemblies of this type are frequently arranged on the inside of a motor vehicle door, the armrest as such being situated in front of the surface of the inside door lining which faces the vehicle interior and its arm support protruding from the inside door lining toward the vehicle interior. However, an armrest of this type can also be installed at other locations on the inside of the body of a motor vehicle, for example, on a rear side wall of a two-door motor vehicle or on a central console. By contrast, the present case does not include arms which are attached directly to a vehicle seat itself in the form of seat backs.

To unlock the armrest in order to be able to undertake a re-setting of the armrest support, it is known to provide an actuating element on the armrest, with which the locking device assigned to the armrest can be unlocked.

SUMMARY OF THE INVENTION

The invention is based on the problem of further improving an armrest subassembly of the type mentioned at the beginning, in particular with regard to the ease of operation.

The armrest-side locking means are coupled to the armrest itself in such a manner that the locking means can be brought into engagement with and can be disengaged from the body-side locking mechanism by a movement of the armrest (together with the arm support formed on the armrest) with a movement component perpendicular to the adjustment path of the armrest. Put another way, the (height-adjustable) armrest which can be set in its position is configured in such a manner that, when unlocked, it can not only be re-positioned (adjusted in height) along an adjustment path but the armrest is additionally mounted with limited movability along a direction which has at least one component perpendicular to the adjustment path of the comfort adjustment of the armrest, this additional movement possibility serving to bring the armrest-side locking means into engagement with or to disengage them from the associated body-side locking mechanism by a locking or unlocking movement. That is to say, a previous unlocking of the locking device assigned to the armrest, which unlocking is required for the re-setting of the position of the armrest, can take place by application of force to the armrest and a corresponding movement of the armrest itself, in the same manner as locking of the armrest after re-setting the armrest position.

In order to clearly differentiate for a user the operation of unlocking or locking the armrest, on the one hand, and re-setting the armrest position (comfort setting), on the other hand, the limited movement of the armrest, which is provided for locking and unlocking the locking device, has a different spatial orientation than the movement (comfort movement) provided for re-setting the armrest position.

According to a preferred embodiment of the invention, the adjusting device comprises a guide device on which the armrest is guided movably, in particular, displaceably, along the adjustment path. A guide device of this type can be formed by one or more guide rails which each extend along the adjustment path or define the latter and on which the armrest is displaceably guided in the direction of extent of the respective guide rail.

Furthermore, it is advantageous that the armrest is elastically prestressed along such a direction which has a component transverse to the adjustment path by means of at least one elastic element (spring element) that the armrest-side locking means have the tendency to engage in the body-side locking mechanism. This means that, in its normal state, the armrest is locked in its current armrest position under the effect of said elastic element by the armrest-side locking means engaging in the body-side locking mechanism. An unlocking of the armrest for the purposes of re-setting the armrest position then has to take place actively by the armrest being moved counter to the prestress of the elastic element in order to disengage the armrest-side locking means from the body-side locking mechanism.

The bearing means, by means of which the armrest is mounted in such a manner that it is movable with a component transverse to the adjustment path of the comfort adjustment in order to bring the armrest-side locking means and the body-side locking mechanism into engagement or to disengage them, can firstly be designed and provided for the pivotable mounting of the armrest, to be precise preferably for the pivotable mounting about an axis which—with reference to the armrest when installed in a motor vehicle—runs essentially along the longitudinal axis of the vehicle. According to another embodiment the bearing means for the longitudinal displaceable mounting of the armrest are designed and provided with a component perpendicular to the adjustment path of the comfort adjustment in order to permit unlocking or locking of the armrest. For this purpose, the armrest is preferably displaceable along a direction which—with reference to the armrest when installed in a motor vehicle—runs along the longitudinal axis of the vehicle. However, a limited displaceability of the armrest along the horizontal transverse axis of the vehicle, i.e. approximately perpendicular to the plane of the door, in the case of an armrest provided on a vehicle door, is also possible.

The possibility of setting the comfort of the armrest along an adjustment path is typically realized by the armrest being coupled to, such that it travels along with, at least one driver which engages movably along the adjustment path on the guide device, to be precise in particular in a guide rail of the guide device. To increase the stability of the armrest, the guide device frequently comprises at least two guide rails which are spaced apart from each other transversely to the adjustment path, with a driver engaging movably along the adjustment path in each of the two guide rails and being coupled on the other side to the armrest.

In the present case here, a rigid coupling is not provided between the armrest and the associated driver or the associated drivers, but rather a coupling is provided via a coupling element which is mounted on the driver with limited movability with a movement component perpendicular to the adjustment path of the comfort setting and is connected on the other side to the armrest. Via this coupling element mounted movably with respect to the associated driver or these coupling elements mounted movably with respect to associated drivers, the additional movability of the armrest according to the invention is then realized along the guide device independently of and in addition to the movability of the drivers, so that a corresponding movement of the armrest can be used to actuate the locking device assigned to the armrest. For this purpose—depending on the embodiment of the invention—the coupling elements can be mounted on the respectively associated driver with limited pivotability or limited longitudinal displaceability.

To connect the armrest to the associated coupling element or the associated coupling elements, according to a preferred embodiment of the invention, an interlocking connection can be provided which is configured in particular as a plug-in connection and/or as a latching connection (clip connection) and which thereby permits a simple connection of the armrest to the coupling elements by plugging them together.

The armrest-side locking means, which can be brought into engagement with and can be disengaged from the body-side locking mechanism to lock or unlock the armrest, can be provided, on the one hand, on the armrest itself. According to another embodiment of the invention, these locking means are arranged on at least one of the coupling elements; and they are formed, for example, by at least one latching element, in particular in the form of a latching projection. By contrast, the body-side locking mechanism is preferably formed by a plurality of locking or latching locations which are arranged consecutively along the adjustment path of the comfort setting and in at least one of which the armrest-side locking means can optionally engage in order to ensure that the armrest is locked in a certain armrest position. The latching locations, which are arranged consecutively along the adjustment path, can be formed, for example, by a plurality of latching openings arranged consecutively or by a longitudinal toothing.

According to a preferred development of the invention, the armrest is formed as a single piece with a door-pulling-shut handle in order to facilitate the grasping of the armrest and an introduction of force into the armrest in order to unlock the locking device.

Furthermore, the possibility provided according to the invention for unlocking and locking the armrest by a movement of the armrest itself can be used particularly advantageously in the case of an armrest subassembly, the armrest of which can be set manually along the adjustment path of the comfort setting. In the case of an armrest subassembly of this type, the re-setting of the armrest position takes place (when the armrest is unlocked) along the adjustment path of the comfort setting by manual application of force to the armrest, i.e. by the action of a vehicle occupant on the armrest along the adjustment direction, but not actuated by an external force by means of an adjustment motor.

When the armrest subassembly is arranged on a motor vehicle door, the armrest itself is situated in front of the interior-side surface of the inside door lining while the guide device provided for guiding the armrest is typically arranged behind the inside door lining on a supporting part of the door body, for example, an inside door panel or an assembly carrier of the motor vehicle door. In this case, slots are to be provided in the inside door lining through which the at least one coupling element and/or the at least one driver reach, via which the armrest is guided movably on the guide device. To cover these slots, covering regions corresponding to the particular driver can be provided.

The adjusting device of the armrest subassembly and/or the locking device of the armrest subassembly is/are preferably arranged, in particular integrally formed, on an assembly carrier (which is advantageously made of plastic) and which can be equipped with vehicle components outside a motor vehicle door and can subsequently be installed together with the vehicle components arranged thereon in a motor vehicle door.

BRIEF DESCRIPTION OF THE DRAWINGS

Further details and advantages of the invention will be made clear in the description below of exemplary embodiments with reference to the figures, in which:

FIG. 1a shows a perspective view of a motor vehicle door from the interior side with a height-adjustable armrest in its lowermost position.

FIG. 1b shows the motor vehicle door from FIG. 1a, the armrest having been adjusted into an upper position.

FIG. 3a shows a detail of the motor vehicle door from FIG. 1a in the region of the armrest.

FIG. 3b shows the arrangement from FIG. 3a without the armrest.

FIG. 4a shows an adjusting device for setting the height of the armrest from

FIG. 3a, which comprises two guide rails extending in the adjustment direction of the armrest with a respectively associated driver and a coupling element for connecting the armrest.

FIG. 4b shows the arrangement from FIG. 4a without the driver.

FIG. 4c shows the arrangement from FIG. 4a without drivers and coupling elements.

FIG. 6a shows a perspective view of a motor vehicle door from the interior side with a height-adjustable armrest in its lowermost position, in accordance with a second exemplary embodiment.

FIG. 6b shows a detail of the motor vehicle door from FIG. 6a in the environment of the armrest which is adjusted into an upper position.

FIG. 7a shows a view of the motor vehicle door from FIG. 6a without the inside door lining.

FIG. 7b shows the arrangement from FIG. 7a after unlocking the armrest in order to re-set the height of the armrest.

FIG. 7c shows the arrangement from FIG. 7b after re-setting the height of the armrest.

FIG. 7d shows the arrangement from FIG. 7c, the armrest being locked in the re-set height of the armrest.

FIG. 9a shows a detail from FIG. 8a, showing one of the guide rails and the associated coupling element, to be precise when locked.

FIG. 9b shows the arrangement according to FIG. 9a when unlocked.

FIG. 10a shows the two guide rails of the adjusting device from FIGS. 8a to 8d.

FIG. 10c shows one of the drivers from FIGS. 8a to 8d together with the associated coupling element.

FIG. 11 shows an example of the arrangement of a covering element on a driver in the case of a motor vehicle door with a height-adjustable armrest of the type illustrated with reference to FIGS. 1a to 5b.

DETAILED DESCRIPTION OF THE INVENTION

Figure 2A:
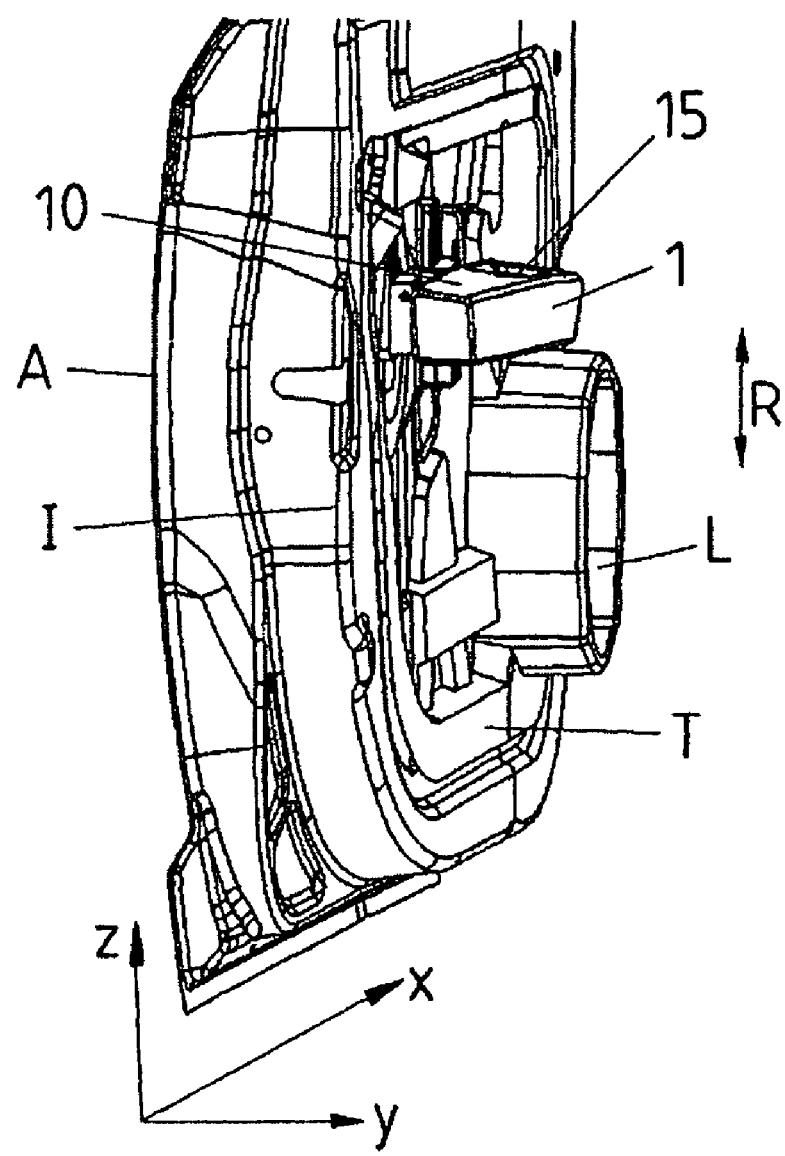
FIG. 2a shows an end view of the motor vehicle door from FIG. 1a without the inside door lining.

FIG. 1a illustrates a motor vehicle door perspectively, to be precise from its inside facing the vehicle interior of a motor vehicle. The motor vehicle door comprises a door body which has an outside door skin A forming an outer design surface of the motor vehicle door, and an inside door skin I, and a window frame F which is connected to the door body and defines and surrounds a window opening which is closeable by a window pane.

The outside door skin A is generally formed by an outside door panel or by an outer wall which is made of plastic and is matched both with regard to its design and with regard to its color to the remaining outer body regions of the corresponding motor vehicle. The inside door skin I is connected to the outside door skin A, if appropriate via an additional connecting frame or the like, and lies opposite said outside door skin, so that the outside door skin A and the inside door skin I enclose the "door shaft" or wet space of a motor vehicle door between them.

The inside door skin I can, on the one hand be of integral design and can be formed, for example, by a continuous inside door wall (preferably made of sheet metal or plastic) or it can, on the other hand, have a large cutout which is covered by an additional inside door skin constituent part referred to as an assembly or door module carrier here. Different functional components of the motor vehicle door, such as, for example, a window lifter, a lock subassembly, a speaker system, a side airbag module, a height-adjusting means for an armrest, electric and electronic control devices or the like, can be preassembled on an assembly or door module carrier of this type outside a motor vehicle door. The assembly carrier together with the functional components, which are preassembled thereon and are preferably pre-checked with regard to their operation, is then installed as a completely premanufactured door module into the associated motor vehicle door. In this state, the assembly carrier forms a constituent part of the inside door skin I.

According to FIG. 1a, the inside door skin I is covered on its side facing the vehicle interior by means of an inside door lining V which is matched to the design of the interior of a motor vehicle. In the present case, an armrest 1 is arranged on the interior side of the inside door lining V, the armrest having an arm support 10 for supporting the forearm of a vehicle occupant and a pulling-shut-handle 15 (which is integrated in the arm support 10) and is designed as a gripping trough of the armrest 1. The arm support 10 of the armrest 1 makes it possible for a vehicle occupant whose seat is situated next to the motor vehicle door illustrated in FIG. 1a to support himself with one hand and an arm, in particular the forearm or the elbow, on the arm support 10.

In the present case, the height of the armrest 1 and therefore of the arm support 10 can be set along an adjustment path which defines an adjustment direction R and which—with reference to the motor vehicle door when installed in a motor vehicle—essentially corresponds to the vertical vehicle axis z. It is therefore a height-adjustable armrest 1. The height of the armrest can thereby be matched optimally to the requirements of a particular vehicle occupant.

The adjusting device required for setting the height of the armrest is arranged, which cannot be seen in FIG. 1a, behind the inside door lining V on the inside door skin I, in particular on an assembly or door module carrier forming a constituent part of the inside door skin I. The connection of the height-adjustable armrest 1 to this adjusting device takes place, according to FIG. 1a, through slots S in the inside door lining V, as will be explained in more detail below.

In the state shown in FIG. 1a, the armrest 1 (extending with its arm support 10 in the longitudinal direction x of the vehicle) is in a lower position from which it can be adjusted by means of the associated adjusting device along the adjustment direction R, i.e. essentially parallel to the vertical vehicle axis z, into an upper position, as shown in FIG. 1b.

There is typically a plurality of different positions along the adjustment direction V, into which the armrest 1 can be brought and in which it can be locked in each case. For an exemplary embodiment of the invention, a convenient possibility will be explained below with reference to FIGS. 2a to 2d for adjusting the armrest from a first position with a first armrest height into a second position with a second armrest height, including the unlocking, required in this case, of the adjusting device before the re-setting of the height of the armrest and a final locking of the adjusting device after re-setting the height of the armrest.

FIG. 2a shows an end view of the motor vehicle door from FIG. 1a but without the inside door lining, thus enabling an assembly or door module carrier T to be seen, which carrier is associated with the inside door skin I and carries different components of the motor vehicle door, such as, for example, the armrest 1 and a speaker L.

In the state shown in FIG. 2a, the armrest 1 is locked in a lower position, so that a vehicle occupant can support himself with his arm on the arm support 10 of the armrest 1. For a re-setting of the position of the armrest 1 along its adjustment direction R (re-setting of the height of the armrest), the armrest 1 first of all has to be unlocked before it can then be raised along the adjustment direction R (i.e. along the adjustment path).

Figure 2B:
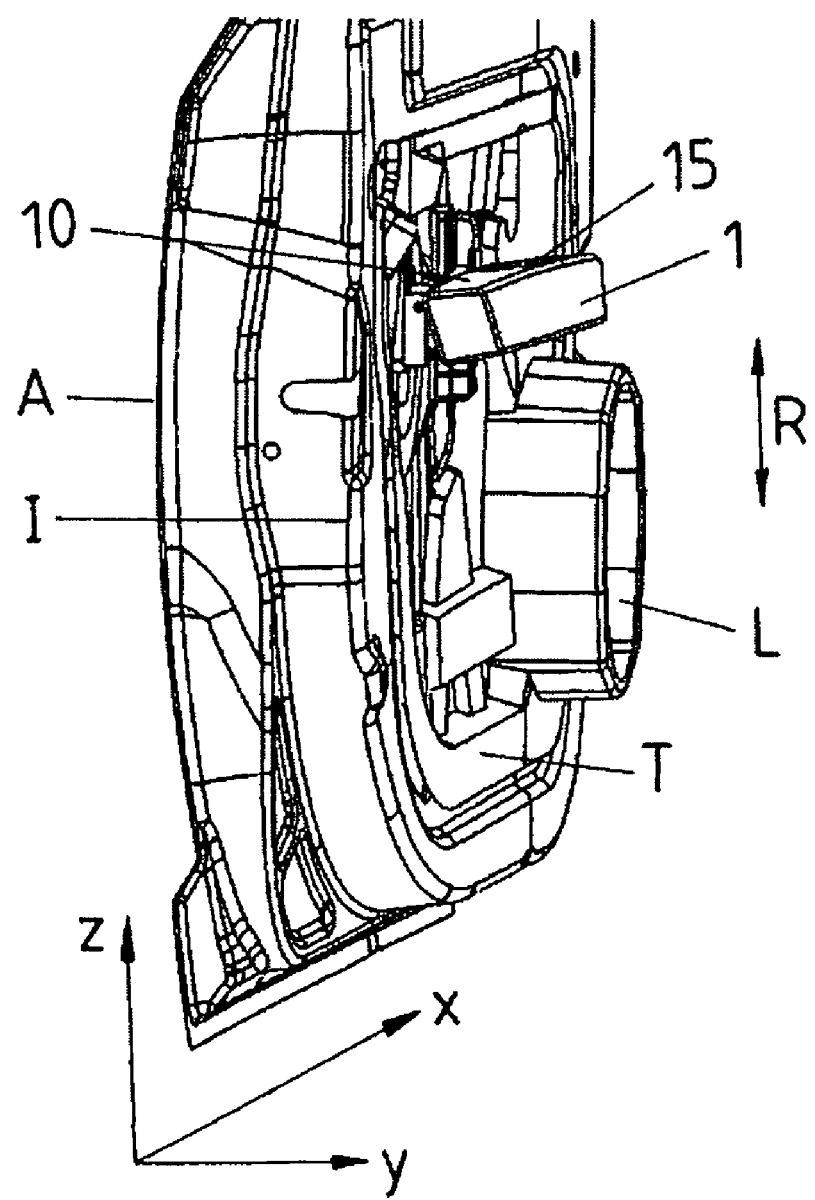
FIG. 2b shows the arrangement from FIG. 2a after unlocking the armrest in order to re-set the height of the armrest.

The unlocking of the armrest 1 or of the adjusting device assigned to the armrest 1 takes place, according to FIG. 2b, by pivoting the armrest 1 (together with its arm support 10) about a pivot axis which—with reference to the armrest when installed in a motor vehicle—runs essentially parallel to the longitudinal axis x of the vehicle, i.e. extends horizontally in the door plane of the motor vehicle door. During this unlocking of the armrest 1 or of the associated adjusting device (which cannot be seen in FIGS. 2a to 2d), the armrest 1 together with the arm support 10 therefore executes a pivoting movement which has a component along a direction y (i.e. along the horizontal transverse axis of the vehicle) which is oriented perpendicularly to the adjustment direction R for a comfort setting of the armrest (parallel to the vertical vehicle axis z). In this case, the vehicle axis which runs both perpendicularly to the longitudinal axis x of the vehicle and perpendicularly to the vertical vehicle axis z is referred to as the horizontal transverse axis y of the vehicle. It extends essentially perpendicularly to the door plane of the motor vehicle door shown in FIGS. 2a to 2d.

Figure 2C:
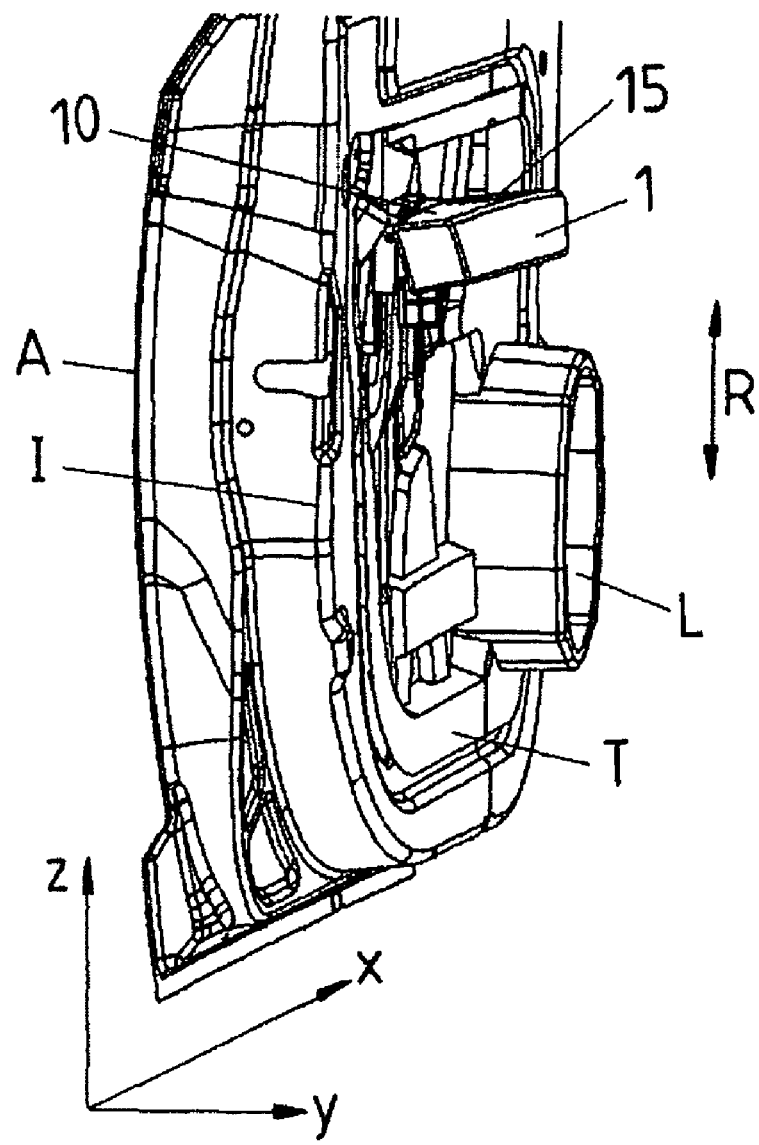
FIG. 2c shows the arrangement from FIG. 2b after re-setting the height of the armrest.

After unlocking the armrest 1 by pivoting the armrest 1, then, for a comfort setting of the armrest 1, its position along the adjustment direction R can be changed, corresponding to the transition from FIG. 2b to FIG. 2c. In the process, the armrest 1 together with the arm support 10 is adjusted in its position along the adjustment direction R (re-setting of the height of the armrest), namely is raised, with the armrest 1 being permanently pivoted (pivoted out) from the normal position shown in FIG. 2a (about the longitudinal axis x of the vehicle). This ensures that, during the movement from the lower position shown in FIG. 2b into the upper position shown in FIG. 2c, the armrest is permanently unlocked.

The pivoting movement required for unlocking the armrest 1 or the associated adjusting device is produced by a vehicle occupant grasping the armrest and exerting a force on it manually leading to the pivoting movement required for unlocking. For this purpose, the vehicle occupant can in particular reach into the door-pulling-shut handle 15 which is integrated in the arm support 10 of the armrest 1, cf. FIGS. 1a and 1b. While the vehicle occupant subsequently re-sets the position of the armrest 1 along the adjustment direction R, likewise manually by the application of force to the armrest 1, he holds the armrest 1 permanently in the pivoted-out position, as illustrated in FIGS. 2b and 2c, in which said armrest is unlocked.

Figure 2D:
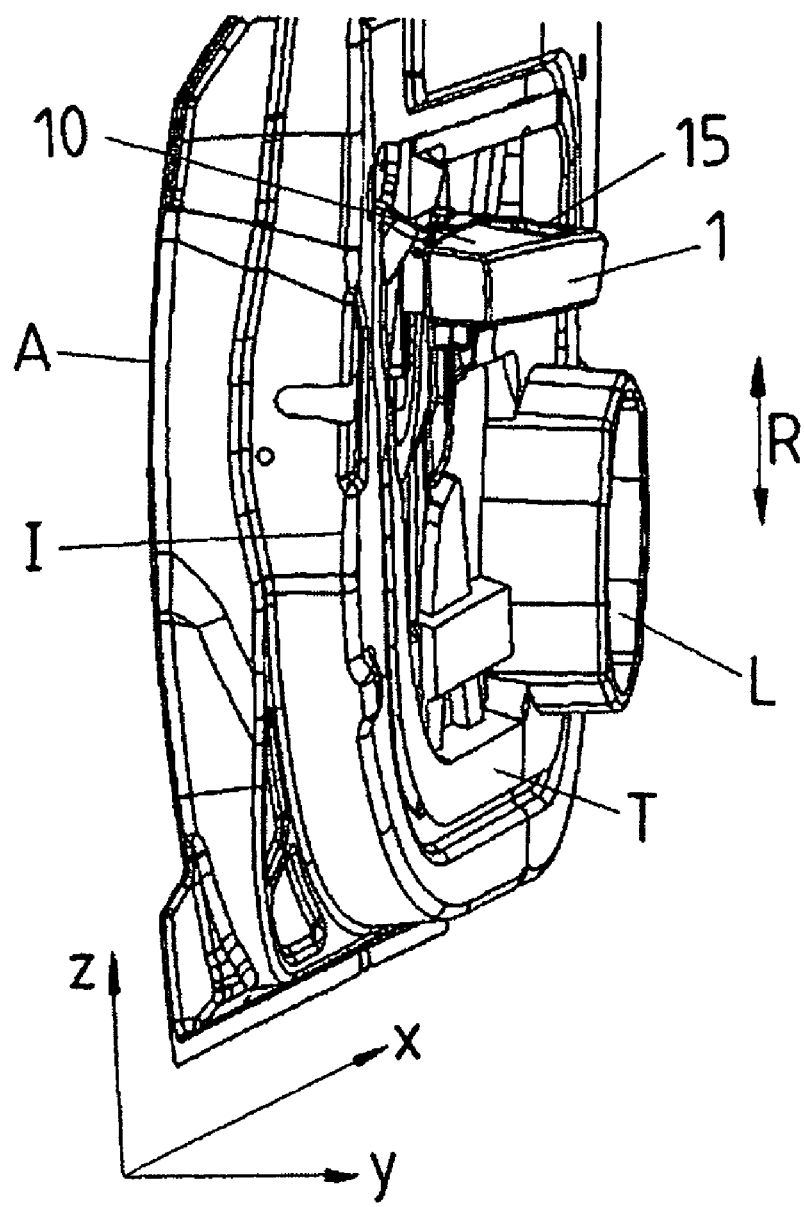
FIG. 2d shows the arrangement from FIG. 2a, the armrest being locked in the re-set height of the armrest.

If the desired new position of the armrest 1 is then reached, the vehicle occupant releases the latter, with an elastic element assigned to the armrest pivoting the latter automatically back out of the pivoted-out position shown in FIGS. 2b and 2c into the normal position shown in FIG. 2d on the inside door lining. The armrest 1 together with the arm support 10 is then locked in a new position, corresponding to a new height of the armrest, and can serve again here for supporting the arm of a vehicle occupant.

As an alternative to the variant shown in FIGS. 2a to 2d, according to which the armrest has to be continuously held actively in the state pivoted out from the normal position during the re-setting of the height of the armrest and then, when the new height of the armrest is reached, pivots back automatically again into the normal position under the action of an elastic element, it can be provided that, after pivoting out the armrest 1 once, the latter initially remains in the unlocked state, to be precise even if it is not actively held in the pivoted-out position. After the new armrest position to be set is reached, the armrest then has to be pivoted back actively in order to lock the latter again.

With reference to FIGS. 3a and 3b, it is clear that the armrest 1, which is arranged on the interior side of the inside door lining V of a motor vehicle door, is connected to the associated adjusting device, which is arranged behind that inside door lining V on the inside door skin I covered by the inside door lining V, via coupling elements 2 which are spaced apart from one another transversely to the adjustment direction R and extend in each case in the adjustment direction R. The respective coupling element 2 can therefore move in the associated slot S of the inside door skin V in the adjustment direction R.

Figure 4A:
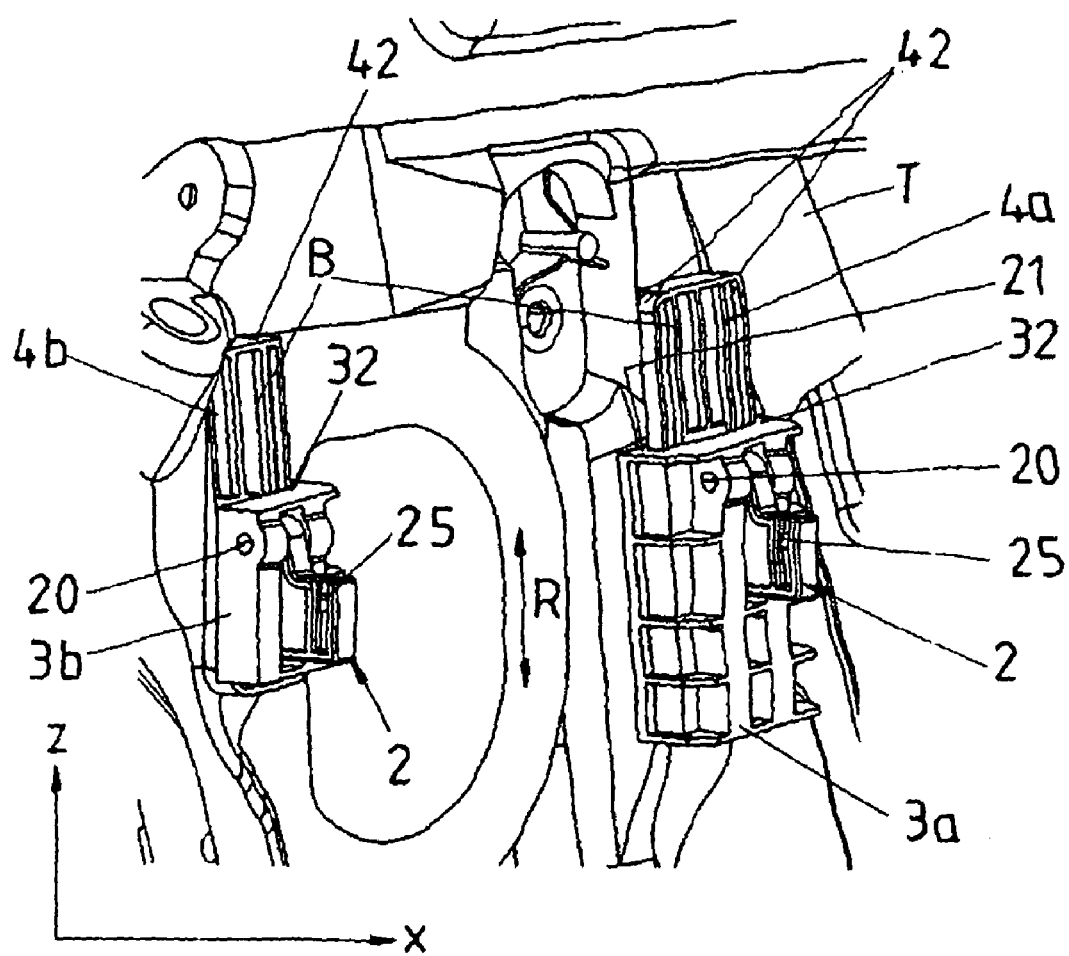

The adjusting device, arranged behind the inside door lining V and by means of which the armrest 1 is displaceable along the adjustment direction R, and which is arranged on an assembly carrier T of the inside door skin I behind the inside door lining V shown in FIGS. 3a and 3b, will be explained in more detail below with reference to FIGS. 4a to 4c.

According thereto, the adjusting device for setting the armrest position (height of the armrest) comprises a guide device, formed by two guide rails 4a, 4b which extend in the adjustment direction R and are spaced apart from each other transversely to the adjustment direction R. Said guide rails are preferably integrally formed as a single piece on the assembly or door module carrier T, which is advantageously possible, in particular in the case of an assembly or door module carrier T made of plastic.

The two guide rails 4a, 4b each have a sliding region 40 and lateral undercuts 42 extending in the adjustment direction R, so that a respectively assigned driver 3a or 3b in the form of a slider with a sliding surface 30 (compare FIGS. 5a and 5b) can slide displaceably in the adjustment direction R on the sliding region 40 of the associated guide rail 4a or 4b and engages here in an interlocking manner in the respective guide-rail-side undercut 42 by means of angled, lateral guide repositioning means 32 (edge repositioning means).

The two guide rails 4a, 4b and the associated drivers 3a, 3b, which are guided thereon in a sliding manner in the adjustment direction R, therefore form an adjusting device for setting the armrest position, which permits a movement of the armrest in the adjustment direction R or along an adjustment path B defined thereby (which can also have a curved profile in the case of a positionally dependent adjustment direction) for re-setting the armrest position (height of the armrest).

Specifically, the adjustment path B is defined by the profile of the two guide rails 4a, 4b, with guide rails extending rectilinearly defining an adjustment path B running along a straight line (with a constant adjustment direction R) and curved guide rails defining a correspondingly curved adjustment path (with a positionally dependent adjustment direction R). The two guide rails 4a, 4b and also the associated drivers 3a, 3b differ in size and structural design. A more stable design of the guide rail 4a and of the associated driver 3a is provided in the region of the door-pulling-shut handle 15 of the armrest 1, since correspondingly large forces can act there during the shutting of the motor vehicle door.

To couple the armrest to this adjusting device, more precisely to the two drivers 3a, 3b, use is made of two coupling elements 2 which are mounted in each case on one of the drivers 3a, 3b in a manner such that they can pivot about an axis 20 running parallel to the longitudinal axis x of the vehicle and which each have a receiving region 25 in the form of a plug-in region for the interlocking receiving of an associated fastening region of the armrest 2. The plug-in regions 25 are preferably configured in such a manner that the armrest can be latched, in particular, can be clipped, by its respectively associated fastening region into one of the coupling-element-side plug-in regions 25. This then produces an interlocking, fixed connection between the armrest and the two coupling elements 2, via which the armrest is then in turn coupled pivotably to the drivers 3a, 3b.

As is clear in particular with reference to FIGS. 4b and 4c, in which the drivers 3a, 3b are not illustrated, a locking mechanism 5a or 5b is integrated in each case in each of the two guide rails 4a, 4b extending longitudinally in the adjustment direction R, said locking mechanism comprising a plurality of locking locations 51 which are arranged consecutively in the adjustment direction R and are formed by locking openings (latching recesses). Said locking locations are integrally formed as a single piece on the particular guide rail 4a or 4b.

Each of the locking locations 51 represents a certain armrest position or armrest height in which the armrest is lockable by a locking means 21, provided on the respectively associated coupling element 2, or a locking element in the form of a locking or latching projection engages in an interlocking manner in one of the locking locations 51. The respective locking mechanism 5a, 5b in the form of consecutively arranged locking locations 51 and the associated coupling-element-side locking means 21 therefore form a locking device, which is assigned to the adjusting device, for setting the armrest position, with which the armrest 1 can be locked in a previously-set armrest position. A comparison of FIGS. 4a to 4c and FIGS. 2a to 2d makes it clear that, in order to unlock the armrest 1, the armrest-side locking means 21 are to be disengaged from the body-side or guide-rail-side locking locations 51, which can take place by a pivoting movement of the armrest 1 together with the coupling elements 2 about the pivot axis 20 provided for this.

If the armrest-side or coupling-element-side locking means 21 are disengaged from the body-side or guide-rail-side locking locations 51, i.e. the coupling elements 2 are pivoted with their locking means 21 out of the respective body-side or guide-rail-side locking mechanism 5a, 5b, then the armrest 1, in the pivoted-out state, can be displaced along the guide rails 4a, 4b in the adjustment direction R and, as a result, can be re-set with regard to the height of the armrest. When the desired armrest position or armrest height is reached, the armrest 1 is then released, in which case it pivots under the effect of at least one elastic element engaging on the armrest 1, into a position in which the coupling elements 2 with their locking means 21 in each case engage in one of the associated locking locations 51. The armrest 1 therefore is then locked in its current position.

As a result, the coupling elements 2 serve, on the one hand, for the pivotable coupling of the armrest 1 to the drivers 3a, 3b of the adjusting device for setting the armrest position by the armrest 1 being fixable on receiving regions 25, provided for it, of the coupling elements 2; by this means, the armrest 1 is coupled to the drivers 3a, 3b in such a manner that it is movable together with the drivers 3a, 3b along the guide rails 4a, 4b in the adjustment direction R. Secondly, the coupling elements 2 form a constituent part of the locking device with which the armrest can be locked in a previously set position by corresponding locking means 21 being integrally formed on the coupling elements 2 and being able to engage in associated guide-rail-side locking locations 51.

In order to ensure a play-free seat of the armrest in the locked position, firstly a conical design of locking elements can be provided; or it can be provided that the locking positions are slightly offset with respect to one another along the two guide rails 4a, 4b.

Figure 5A:
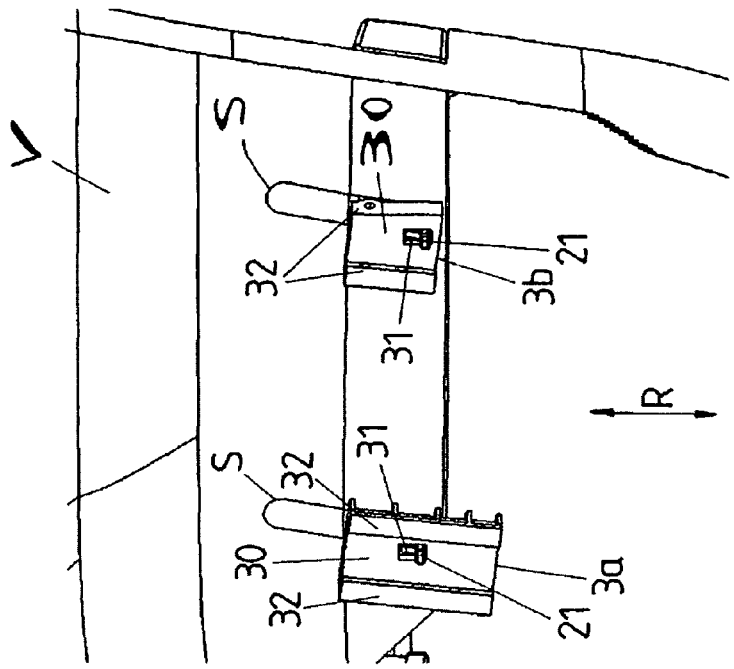
FIG. 5a shows a rear view of the drivers from FIG. 4a together with covering elements for covering slots in the inside door lining.
Figure 5B:
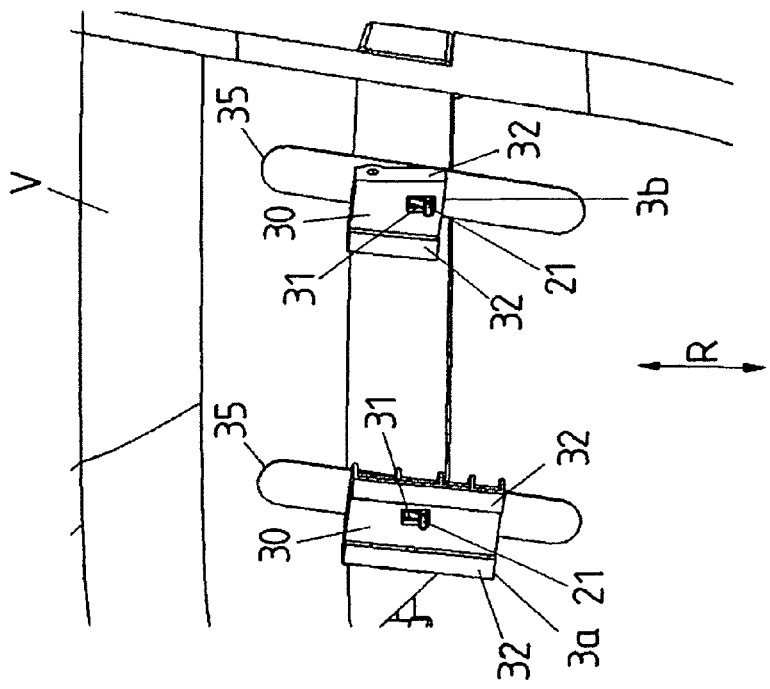
FIG. 5b shows the arrangement from FIG. 5a without covering elements.

FIGS. 5a and 5b show a rear view of the inside door lining V together with the drivers 3a, 3b which are guided on the guide rails of the adjusting device of the armrest and sliding surfaces 30 and angled, lateral guide repositioning means 32 of which can be clearly seen in FIGS. 5a and 5b. It can furthermore be seen that the drivers 3a, 3b have, in their respective sliding surface 30, a passage opening 31 through which the locking means 21 of the coupling element 2 mounted on the respective driver 3a, 3b can be brought into engagement with one of the locking locations 51 of the locking mechanism 5a, 5b (compare FIGS. 4a to 4c).

According to FIG. 5a, each of the drivers 3a, 3b carries a covering element 35 with which the slots S provided in the inside door lining V for the coupling elements 2 to reach through can be covered, compare FIG. 5b (in which the covering elements 35 are not illustrated). This prevents a vehicle occupant from being able to see the functional components of the motor vehicle door, which are arranged on the inside door skin I, or from being able to act on them through the slots S in the inside door lining V. The length of the covering elements 35 in the adjustment direction R is selected in such a manner that they over the associated slots S in every position of the drivers 3a, 3b.

FIG. 6a shows a further exemplary embodiment of a motor vehicle door which has a door body, comprising an outside door skin A and an inside door skin I, and a window frame F surrounding a window opening, the inside door skin I being covered toward the vehicle interior by means of a door lining V and an armrest I which is height-adjustable along an adjustment direction R and has an arm support 10 and a door-pulling-shut handle 15 being arranged on the interior-side surface of the inside door lining V.

As in the case of the exemplary embodiment illustrated in FIGS. 1a to 5b, the armrest 1 shown in FIG. 6a can also be transferred by means of an adjusting device, which is covered by the inside door lining V and to which the armrest 1 is coupled through slots S in the inside door lining V, into different positions, for example the position shown in FIG. 6b, in which the armrest 1 is arranged above the position shown in FIG. 6a.

FIG. 7a shows a detail of the motor vehicle door from FIG. 6a without the inside door lining, so that part of the adjusting device assigned to the armrest 1 can be seen. Said adjusting device is arranged on an assembly or door module carrier T which forms a constituent part of the inside door skin I of the motor vehicle door and on which different functional components of a motor vehicle door can be preassembled before the assembly or door module carrier T together with the components fitted thereon is installed into a motor vehicle door as a constituent part of the inside door skin I.

Of the adjusting device assigned to the armrest 1, in FIG. 7a, two guide rails 4a, 4b can be seen, said guide rails extending in the adjustment direction R, being spaced apart from each other transversely to the adjustment direction R and preferably being formed integrally as a single piece on the door module carrier T (made of plastic) and on which the armrest 1 is guided movably in the adjustment direction R via a respective driver. It can also be seen in FIG. 7a that a locking mechanism 5a is provided on a guide rail 4a, said locking mechanism being formed by a plurality of locking locations 51 which are arranged consecutively in the adjustment direction R of the armrest 1 and are in the form of locking openings or latching openings. In the present case, said locking locations are arranged on the associated guide rail 4a in such a manner and are oriented in such a manner that the armrest 1 can be unlocked by a longitudinal movement parallel to the longitudinal axis x of the vehicle (i.e. transversely to the adjustment direction R of the armrest 1) by armrest-side locking means being disengaged from the locking locations 51 of the locking mechanism 5a. This is illustrated in FIG. 7b, in which the armrest 1 is shown at the same armrest height as in FIG. 7a but is shifted or displaced slightly to the rear along the longitudinal axis x of the vehicle (counter to the forward direction of travel of a motor vehicle) in order to disengage the armrest-side locking means from the body-side or guide-rail-side locking mechanism 5a.

The armrest 1 can subsequently be guided (raised), as can be seen with reference to the transition from FIG. 7b to FIG. 7c, in the adjustment direction R into a new armrest position. This preferably takes place again manually by the armrest, which has been shifted or displaced slightly along the longitudinal axis x of the vehicle for unlocking purposes being additionally subjected to a force in the adjustment direction R along the vertical vehicle axis z.

If the armrest 1 is then released in the new armrest position shown in FIG. 7c, it moves again along the longitudinal axis x of the vehicle (out of the deflected position shown in FIG. 7c) under the effect of an elastic element, which is provided for this and acts on the armrest 1, into the normal position which is illustrated in FIG. 7d and in which the armrest-side locking means engage in the body-side or guide-rail-side locking mechanism 5a.

The sequence of steps, shown in FIGS. 7a to 7d, for the re-setting of the armrest position is illustrated once again in FIGS. 8a to 8d without the armrest 1 to be adjusted in order to enable the construction and the interaction of the components of the adjusting mechanism assigned to the armrest 1 to be seen better. In this case, the adjusting-device states illustrated successively in FIGS. 8a, 8b, 8c and 8d correspond precisely to the states which are illustrated successively in FIGS. 7a, 7b, 7c and 7d of the armrest 1 which can be adjusted in height with the adjusting device.

According to FIG. 8a, a respective driver 3a, 3b is guided on the sliding surface 40 of each of the two guide rails 4a, 4b which extend in the adjustment direction R and are spaced apart from each other transversely to the adjustment direction, the two drivers 3a, 3b being connected rigidly to each other via a connecting region 300.

The one driver 3a has two angled, lateral guide repositioning means 32 via which it engages in an associated guide-rail-side undercut 42 extending in the adjustment direction R. By contrast, the other driver 3b is only assigned one undercut 42 on the associated guide rail 4b, which undercut can be engaged behind by a lateral guide repositioning means of the driver 3b. The two drivers 3a, 3b are therefore displaceable along the respectively assigned guide rails 4a, 4b in the adjustment direction R of the armrest to be adjusted, with the two drivers 3a, 3b always being moved together by the rigid coupling via the connecting region 300. This also dispenses with the necessity of the two drivers 3a, 3b having to engage behind the associated guide rail 4a or 4b at two undercuts 42 in each case.

To connect the armrest to the drivers 3a, 3b, use is also made here of two coupling elements 2 with a respective receiving region 25 for a fastening region of the armrest, so that the armrest can be secured on the coupling elements 2 by plugging the fastening regions provided for this into the receiving regions 25 of the coupling elements 2 and can thereby be coupled to the drivers 3a, 3b.

In contrast to the exemplary embodiment illustrated with reference to FIGS. 1a to 5b, the coupling elements 2 here are not mounted pivotably but rather displaceably, to be precise—with reference to one installed in a motor vehicle—displaceably along the longitudinal axis x of the vehicle, on the respectively assigned driver 3a or 3b in order to be able to bring coupling-element-side locking means into engagement with the body-side or guide-rail-side locking mechanism 5a or, more precisely, its locking locations 51 and to be able to disengage them therefrom. In contrast to the exemplary embodiment illustrated with reference to FIGS. 1a to 5b, a locking mechanism 5a of this type with a plurality of locking locations 51 arranged consecutively in the adjustment direction R is only provided in one guide rail 4a.

Here again, too, the two guide rails 4a, 4b, which are spaced apart from each other transversely to the adjustment direction R, and the associated drivers 3a, 3b differ in design, with the guide rail 4a and the associated driver 3a being of particularly stable configuration and being situated in the region of the pulling-shut-handle 15 of the armrest 1 (compare FIGS. 6a and 6b).

Figure 8C:
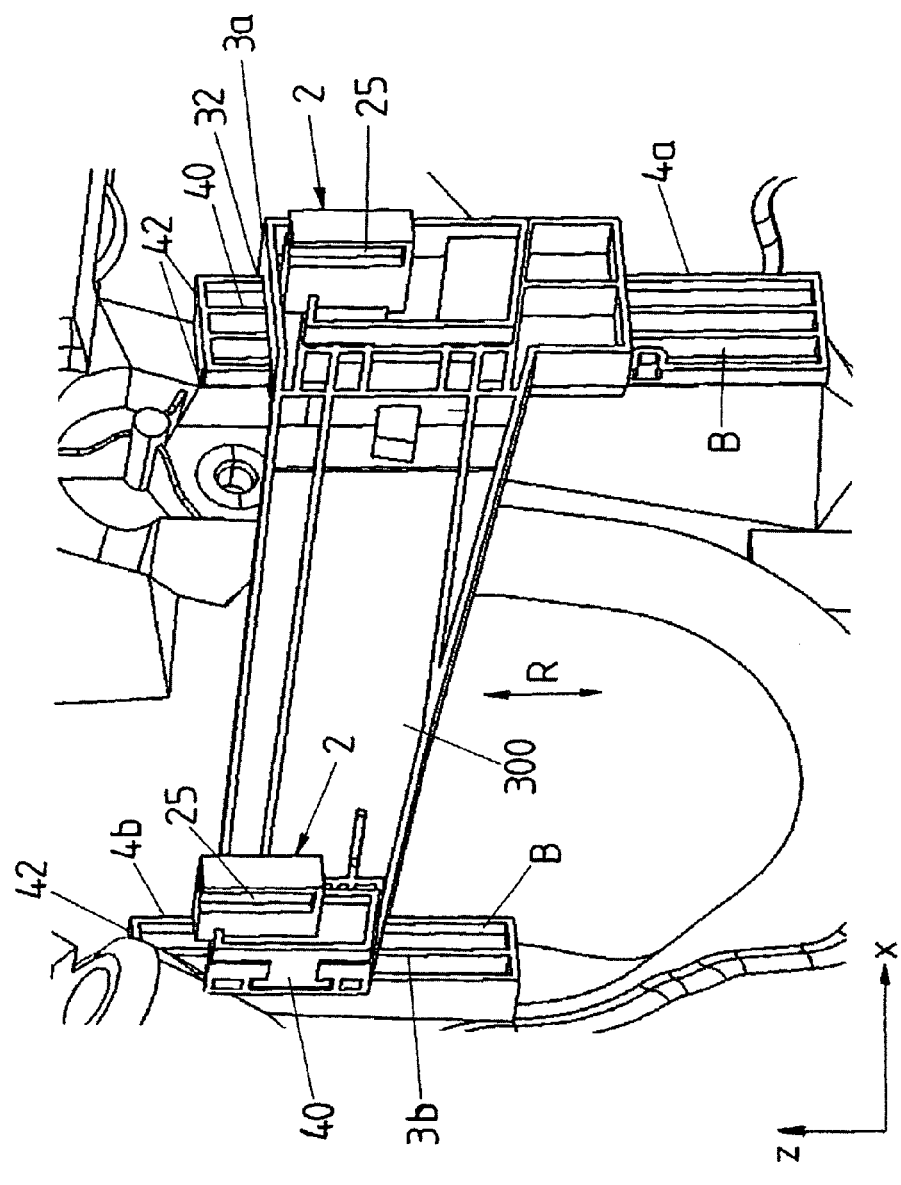
FIGS. 8a 8d show views according to FIGS. 7a to 7d, but without the armrest, so that the adjusting device for setting the height of the armrest can be seen, which comprises two guide rails extending in the adjustment direction of the armrest, drivers guided thereon and coupling elements for coupling the armrest to the drivers.

FIG. 8b shows the arrangement from FIG. 8a, with the armrest having been unlocked by a slight longitudinal movement of the coupling elements 2 with respect to the associated drivers 3a, 3b, for re-setting the armrest position. The re-setting of the armrest along the adjustment direction R can then be seen with reference to the transition from FIG. 8b to FIG. 8c at which an adjustment movement of the drivers 3a, 3b upward in the adjustment direction R along the associated guide rails 4a, 4b can be seen.

FIG. 8d finally shows the drivers 3a, 3b in the end position according to FIG. 8c, but with the coupling elements 2, which are arranged on the drivers 3a, 3b, having been returned along the longitudinal axis x of the vehicle into a position in which the armrest is re-locked.

FIG. 9a shows, in greater detail, the one guide rail 4a which has a locking mechanism 5a in the form of a plurality of locking locations 51 which are arranged consecutively in the adjustment direction R and are formed by locking or latching openings. It can furthermore be seen that the coupling element 2 assigned to this guide rail 4a has locking means 21 in the form of locking or latching projections which can engage in the locking locations 51 of the locking mechanism 5a to lock the armrest arranged on the coupling elements 2 or on the mounts 25 thereof. The driver (3a), on which the coupling element 2 shown in FIG. 9a is displaceably mounted, is not illustrated in FIG. 9a—nor in FIG. 9b—in order to make it possible to see the interaction of the coupling-element-side locking means 21 with the guide-rail-side locking mechanism 5a and the locking locations 51 thereof.

FIG. 9b shows the arrangement from FIG. 9a in a state in which the coupling element 2 assigned to the guide rail 4a has been displaced along the longitudinal axis x of the vehicle (along the associated driver 3a, compare FIG. 10c) in such a manner that the coupling-element-side locking means 21 are disengaged from the locking locations 51 of the guide-rail-side locking mechanism 5a. In the unlocked state, the armrest can then be reset in its height along the adjustment direction R.

A look at FIGS. 9a and 9b also shows that the coupling-element-side locking means 21 are formed here by more than one, namely three, locking elements or latching projections which can engage in, in each case, three of the associated, guide-rail-side locking openings or latching openings 51. This achieves increased strength of the locking.

In summary, the state of the locking device shown in FIG. 9a corresponds to the state of the armrest subassembly in FIGS. 7a and 8a or in FIGS. 7d and 8d, in which the armrest 1 and the associated drivers 3a, 3b are locked in their current position on the associated guide rail 4a, 4b via the locking device 21, 51. By contrast, the state of the locking device 21, 51 illustrated in FIG. 9b corresponds to the state of the armrest subassembly from FIGS. 7b and 8b or 7c and 8c, according to which the armrest 1 and the associated drivers 3a, 3b are unlocked for re-setting the height of the armrest along the adjustment direction R.

Figure 10B:
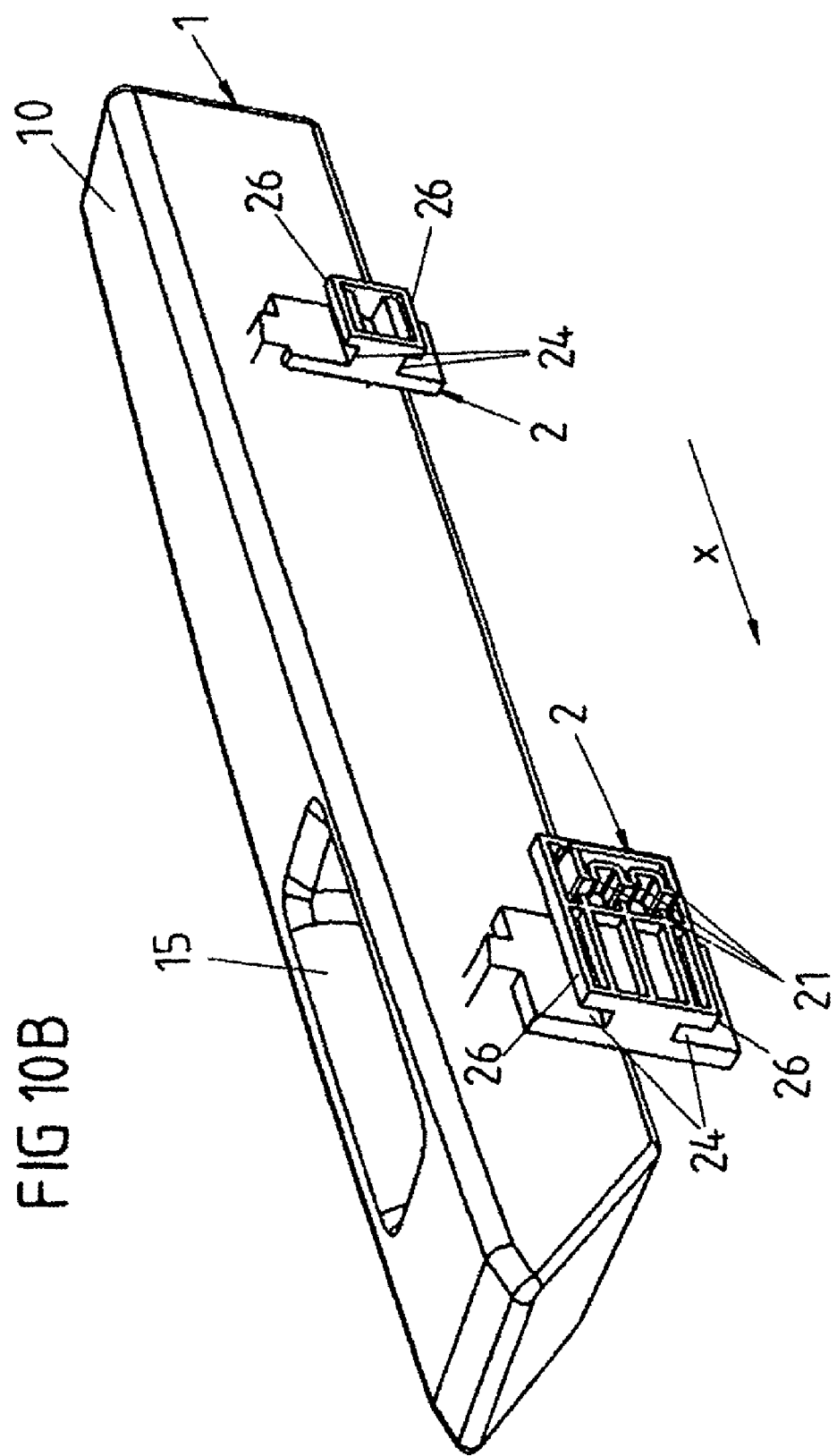
FIG. 10b shows the armrest together with the two coupling elements from FIGS. 8a to 8d.

The mounting, which is displaceable longitudinally in the longitudinal direction x of the vehicle, of the coupling elements 2, on which the armrest 1 is secured, on the associated drivers 3a, 3b is clarified with reference to an overall view of FIGS. 10a to 10c—to be precise using the example of the one driver 3a. For this purpose, the coupling elements 2 have guide grooves 24 extending in the longitudinal direction x and guide projections 26, associated driver-side guide projections 34 engaging in the coupling-element-side guide grooves 24 and, conversely, the coupling-element-side guide projections 26 engaging in driver-side, associated guide grooves 36. This permits a displaceability of the coupling elements 2 together with the armrest 1 secured thereon in the longitudinal direction x with respect to the drivers 3a, 3b, which displaceability can be limited by means of suitable stops in order to be able to lift the locking means 21 provided on the one coupling element 2 out of the locking locations 51 provided on the associated guide rail 4a. The limited movement required for this of the corresponding coupling element 2 in the longitudinal direction x of the vehicle can be limited, for example, by, on the other guide rail 4b, the coupling element 2 there coming into engagement with a stop of the associated driver 3b. In principle, however, any desired suitable means for limiting the movement of the coupling elements 2 and of the armrest 1 when lifting them out of the guide-rail-side locking mechanism 5a can be used.

Different fastening possibilities are available for fastening covering elements 35 to the drivers 3a, 3b in order to cover the slots S provided, according to FIGS. 1a and 1b, in the inside door lining V. FIG. 11 shows, by way of example, starting from the arrangement according to FIG. 4a, the fastening of a covering element 35 to a driver 3b guided along a guide rail 4b by means of an interlocking connection. For this purpose, the covering element 35 has an (angled) fastening tab 36 with a fastening opening 36a (clip opening) through which an interlocking element 37, which is arranged on the driver 3b and is in the form of a clip hook, reaches. The interlocking connection between driver 3b and covering element 35 is therefore designed here as a clip connection with a first clip element in the form of a clip opening 36a and an associated second clip element in the form of a clip hook 37. Of course, other interlocking connecting means may also be provided for fixing the covering element 35 to one of the drivers 3a, 3b. Furthermore, connecting means other than interlocking connecting means may also be used for this; the sole important factor is that the respective covering element 35 is connected to, such that it travels along with, the associated driver 3a or 3b, so that the covering element 35 is carried along during a movement of the respective driver 3a, 3b in the adjustment direction R.

So that a coupling element 2 which is mounted pivotably on the respective driver 3a, 3b can reach through the slots S in the inside door lining V (compare FIGS. 1a and 1b), thus making it possible for the armrest to be coupled via said coupling element 2 to the adjusting device formed by the drivers 3a, 3b and the guide rails 4a, 4b, a respective passage opening 35a in the form of an elongate hole for the corresponding coupling element 2 is provided in the covering elements 35.

Figure 12:
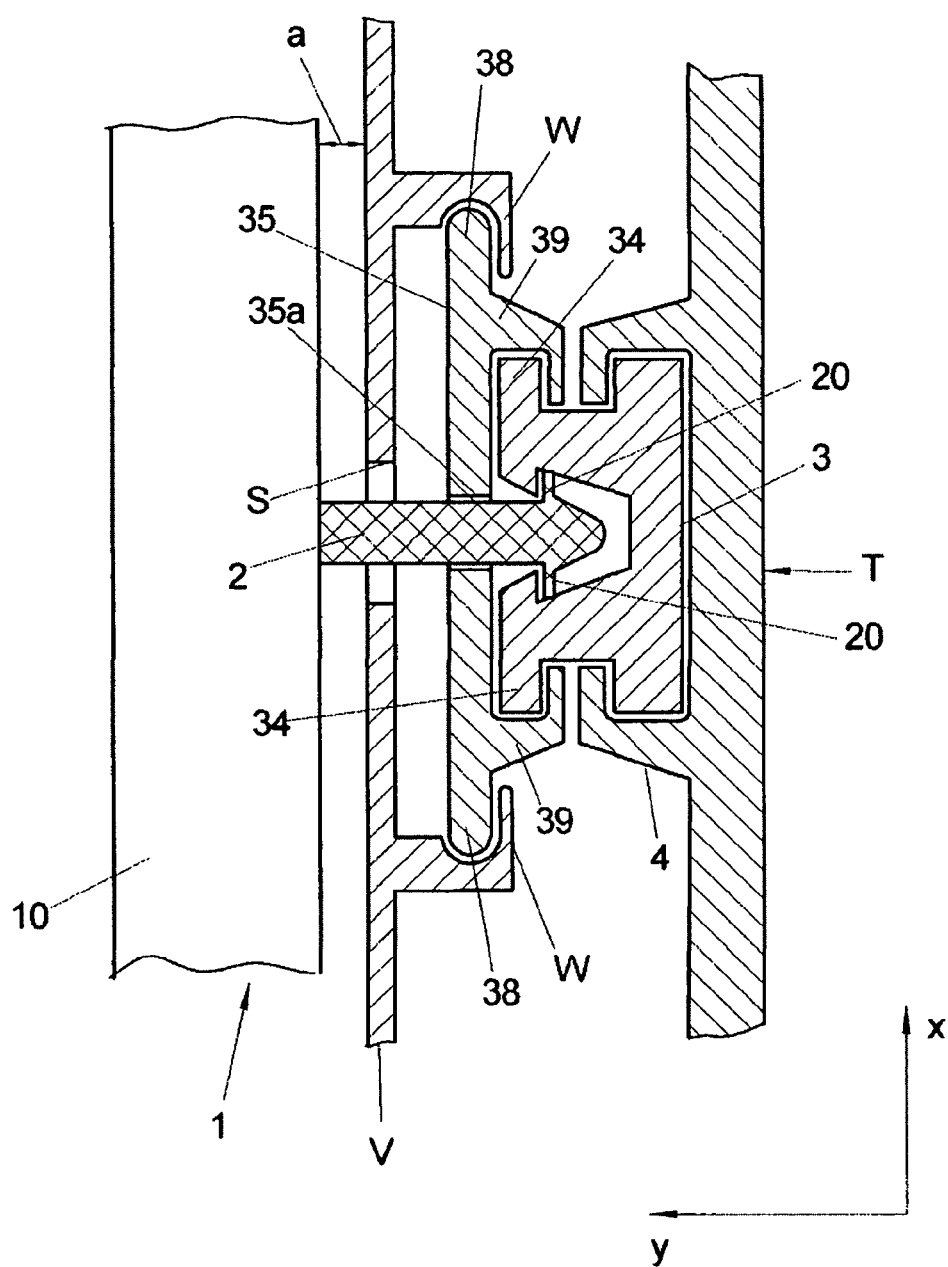
FIG. 12 shows a cross-sectional illustration of a motor vehicle door in the region of a height-adjustable armrest which comprises means for maintaining a defined distance between the armrest and an inside door lining of the motor vehicle door.

FIG. 12 diagrammatically shows a cross section through a motor vehicle door of the type described with reference to FIGS. 1a to 5b, in the region of a height-adjustable armrest.

A guide rail 4 on which a driver 3 is guided movably along an adjustment direction is integrally formed as a single piece, preferably made of plastic, on an assembly carrier T of the motor vehicle door. A coupling element 2 is firstly mounted on the driver 3 in a manner such that it can pivot about an axis 20 and is connected to the armrest 1 in a manner not illustrated specifically, and, secondly, a covering element 35 is fixed to the driver 3, for example, in the manner described above with reference to FIG. 11, the covering element serving to cover a slot S in the inside door lining V. The coupling element 2 reaches through the slot S in order to couple the driver 3 arranged behind the door module side of the inside door lining V to the armrest 1 arranged in front of the interior side of the inside door lining V. For this purpose, the covering element 35, which serves as a panel, has a passage opening 35a for the coupling element 2, which passage opening is dimensioned in such a manner that it is essentially closed by the coupling element 2, i.e. does not permit a view from the interior of the vehicle of the assembly carrier T and the functional components arranged thereon of a motor vehicle door.

It can furthermore be seen with reference to FIG. 12 that the driver 3 and the covering element 35 interact via interlocking regions 34 formed on the driver 3, on the one hand, and interlocking elements 39 formed on the covering element 35, on the other hand, and are supported on each other in such a manner that a defined permanent and rigid spatial positioning of the covering element 35 on the driver 3 is ensured. Furthermore, the covering element 35 is guided with two lateral guide regions 38 in a longitudinal guide which is formed on the inside door lining V (by means of two angled sections W) which extends in the adjustment direction of the armrest parallel to the guide rail 4 provided on the assembly carrier T.

By means of the rigid, permanent and unambiguous positioning of the covering element 35 on the driver 3 and the simultaneous defined positioning of the covering element 35 with respect to the inside door lining V via the guide means 38, W, a defined positioning of the driver 3 with respect to the inside door lining V along the horizontal transverse axis y of the vehicle, i.e. perpendicularly to the door plane or perpendicularly to the plane defined by the longitudinal axis x of the vehicle and the vertical vehicle axis z is ensured at same time, to be precise, both in the locked state of the armrest and during an adjusting movement of the armrest.

On the other hand, for each pivoting state, a defined relative positioning of the armrest 1 with respect to the driver 3 along the horizontal transverse axis y of the vehicle is ensured via the coupling element 2, which is coupled to the driver 3 in a manner defined by means of a pivot axis 20 and which is connected, on the other hand, at its end facing away from the driver 3 to the armrest 1. This in turn also defines the relative position of the armrest 1 with respect to the inside door lining V along the horizontal transverse axis y of the vehicle, so that a specific, predeterminable distance a between the armrest 1 and the inside door lining V can be set and maintained along that direction y. This distance a can be selected in such a manner that, on the one hand, there is not a great gap spoiling the design, between the armrest 1 and the inside door lining V, but, on the other hand, it is to be ensured that, during a height adjustment, the armrest 1 as far as possible does not touch the inside door lining V, so that wear phenomena do not occur on the inside door lining V by contact with the armrest 1 during an adjustment of the armrest position.

As a result, the coupling element 2 and the covering element 35 form means for the defined positioning, on the one hand, of the armrest 1 and on the other hand, of the inside door lining V with respect to the driver 3, which is guided on the assembly carrier T, along the horizontal transverse axis y of the vehicle and therefore form means for setting a defined distance a between the armrest 1 and the inside door lining V along that direction y, to be precise, in particular during an adjustment movement of the armrest 1.

The means, described with reference to FIG. 12, for positioning the armrest 1 with respect to the inside door lining V can also be used in situations in which the armrest 1 is not, according to the invention, movable, in particular pivotable, for locking and unlocking a locking device. In this case, the coupling element 2 which is mounted movably (pivotably) on the driver 3 is to be replaced by a coupling element connected rigidly to the driver 3.

According to a differing embodiment, it can be provided to configure the adjusting device, with which the position of the armrest is adjustable along an adjustment direction, in such a manner that, during the unlocking of the armrest, the distance between armrest and inside door lining is increased along the horizontal transverse axis of the vehicle, so that, during an adjustment movement of the armrest, there is no contact between armrest and inside door lining, and that, during the later locking of the armrest, the distance between armrest and inside door lining is reduced again, so that, in the locked state of the armrest, there is as far as possible no gap between armrest and inside door lining.

Figure 13:
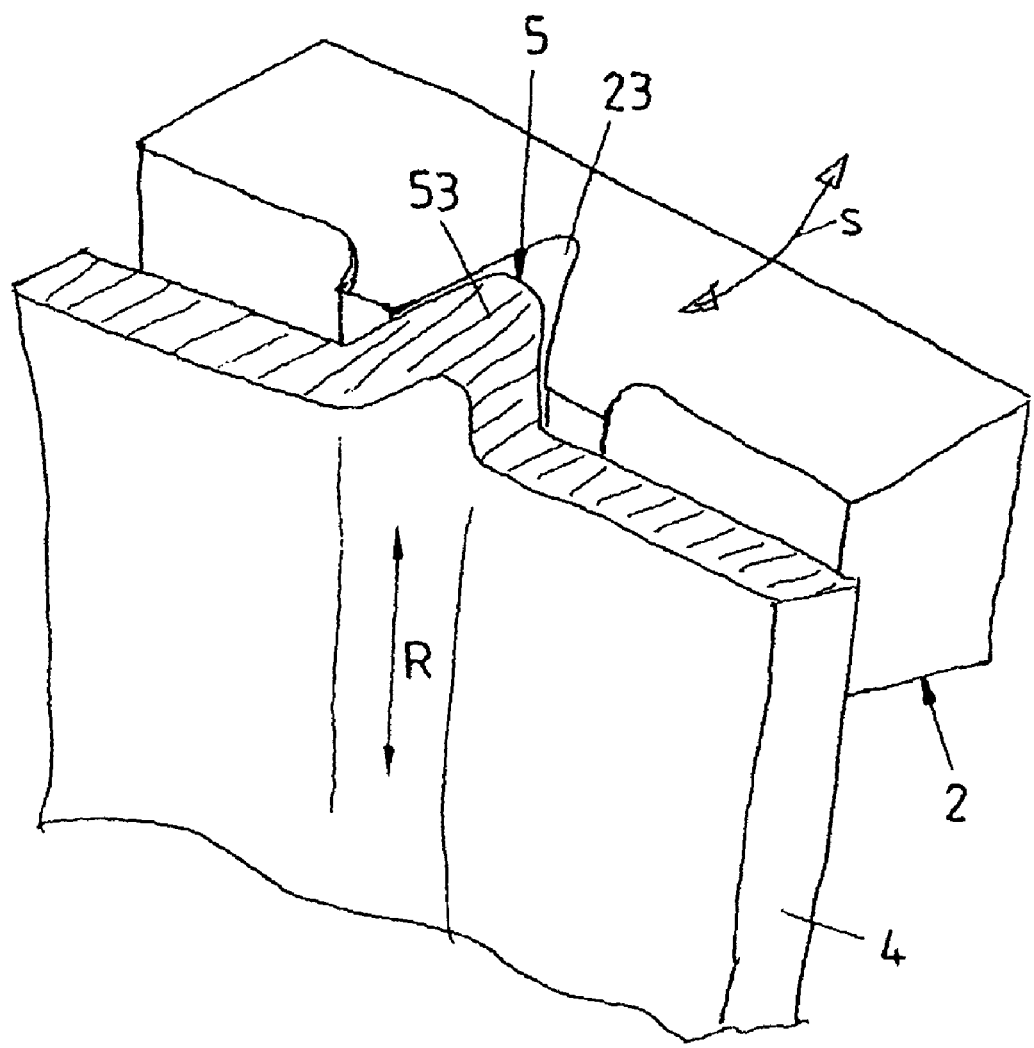
FIG. 13 shows a schematic illustration of a locking mechanism, which is based on a clamping action, for locking a height-adjustable armrest in its current position.

FIG. 13 shows diagrammatically a further exemplary embodiment of a locking device with which the armrest can be locked in a previously set armrest position, to be precise based on an infinitely variable locking principle which permits infinitely variable locking of the armrest in any desired armrest positions which can be approached by displacing the armrest along its adjustment direction.

The locking device illustrated in FIG. 13 is based on a locking of the armrest in a previously set armrest position by clamping. For this purpose, there is provided on at least one coupling element 2, which can be adjusted in height together with the armrest, as locking means, a clamping surface 23 designed as a wedge surface, which can be brought into engagement with and can be disengaged from, a corresponding clamping surface 53 in the form of a wedge surface, provided on the body-side guide rail 4 as the locking mechanism in any desired position along the adjustment direction R, to be precise by pivoting the coupling element 2 during a corresponding action on the armrest, as is described further above with reference to FIGS. 1a to 10c. A corresponding pivoting movement s with which the coupling-element-side locking means, formed by the wedge surfaces 23, can be brought into engagement with and can be disengaged from the guide-rail-side locking means, formed by corresponding wedge surfaces 53, is indicated diagrammatically in FIG. 13 by means of a double arrow.

In order, when very large forces are applied to the armrest, in particular as a consequence of misuse, for example, if a vehicle occupant kneels on the armrest, to ensure that such forces are supported, the armrest subassembly can be assigned stops on the door body, in particular on the assembly carrier, and/or on the inside door lining, which stops can also support very large forces and which limit a lowering of the armrest along the adjustment direction R to a specific, lowermost armrest position.

A locking device which is based on a clamping effect can be configured in such a manner that it does not need to support particularly large forces attributed to misuse. On the contrary, the armrest slips as far as the abovementioned stop when such forces are exerted on the armrest.

Figure 14:
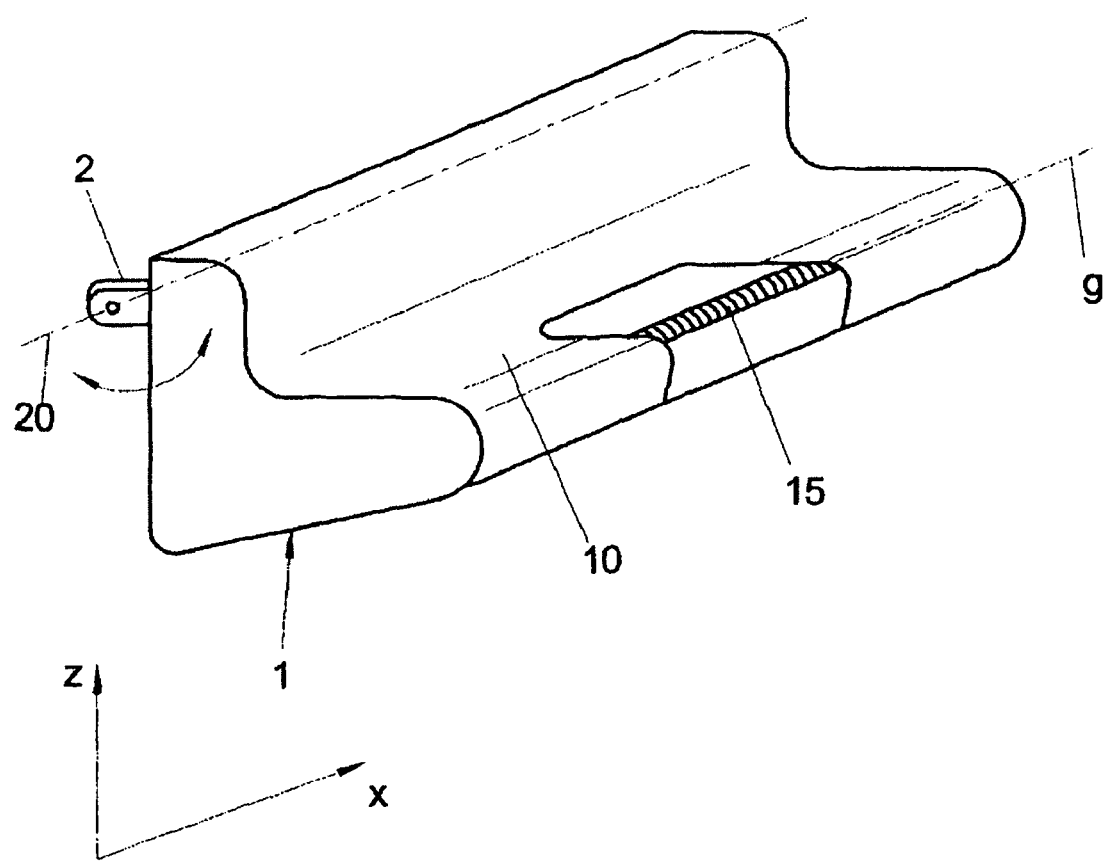
FIG. 14 shows a perspective illustration of a height-adjustable armrest with an integrated door-pulling-shut handle.

If a door-pulling-shut handle 15 is integrated in the armrest 1 according to FIG. 14, it is advantageous to arrange the pivot axis 20, via which the armrest-side coupling elements 2 are connected to a driver of a body-side guide device for the armrest and about which the armrest 1 can be pivoted in order to lock or unlock the associated locking device, in such a manner that, as the motor vehicle door is being pulled shut by action on the pulling-shut handle 15, the armrest 1 is not unlocked.

Thus, according to FIG. 14, the pivot axis 20 of the at least one coupling element 2 and of the armrest 1 runs—as viewed along the vertical vehicle axis z—above a straight line g which extends parallel to the pivot axis 20 and which intersects the door-pulling-shut handle 15. In the present case, the arrangement is configured in such a manner that, to unlock the locking device assigned to the armrest 1, a pivoting movement of the armrest 1 about the pivot axis 20 is required which could at most be produced by compressive forces on the armrest 1 in the region of the pulling-shut handle 15. The tensile forces acting during the shutting of the motor vehicle door are therefore unable to bring about an unlocking of the locking device assigned to the armrest 1 in any situation.

The invention claimed is:

1. Armrest subassembly for a motor vehicle configured for arrangement on the interior side of a motor vehicle body, the armrest subassembly comprising:
   an armrest having an arm support for supporting the arm of a motor vehicle occupant;
   an adjusting device configured to set the position of the armrest along an adjustment path;
   a locking device configured to lock the armrest in a set armrest position;
   armrest-side locking means of the locking device configured to be brought into engagement with an associated body-side locking mechanism to lock the armrest and configured to be disengaged from the body-side locking mechanism to unlock the armrest;
   wherein the armrest-side locking means are coupled to the armrest in such a manner that the armrest-side locking means are configured to be brought into engagement with and configured to be disengaged from the body-side locking mechanism by a movement of the armrest with a component perpendicular to the adjustment path; and
   wherein the armrest is elastically prestressed with a component transverse to the adjustment path in such a manner that the armrest-side locking means engage in the body-side locking mechanism under the effect of the elastic prestress.

2. Armrest subassembly according to claim 1, wherein the adjusting device comprises a guide device on which the armrest is guided movably along the adjustment path.

3. Armrest subassembly according to claim 1 or 2, wherein the armrest is displaceable along the adjustment path.

4. Armrest subassembly according to claim 1, wherein the guide device has at least one guide rail on which the armrest is guided displaceably along the adjustment path.

5. Armrest subassembly according to claim 4, wherein the guide device has at least two guide rails spaced apart from each other transversely to the adjustment path.

6. Armrest subassembly according to claim 1, wherein the locking means can be disengaged from the locking mechanism counter to the effect of the prestress by means of a movement of the armrest with a component perpendicular to the adjustment path.

7. Armrest subassembly according to claim 1, further comprising a bearing device, wherein the armrest is mounted with the bearing device, and wherein the armrest is movable with a component transverse to the adjustment path in order to bring the armrest-side locking means and the body-side locking mechanism into engagement and to disengage the armrest-side locking means and the body-side locking mechanism.

8. Armrest subassembly according to claim 1, wherein the armrest is movable with a component transverse to the adjustment path by manual application of force to the armrest.

9. Armrest subassembly according to claim 7, wherein the bearing device is configured for a pivotable mounting of the armrest, wherein by pivoting the armrest the armrest-side locking means and the body-side locking mechanism can be brought into engagement and can be disengaged.

10. Armrest subassembly according to claim 9, wherein the armrest is pivotable about an axis extending essentially along the longitudinal axis of the vehicle when the armrest is installed in a motor vehicle.

11. Armrest subassembly according to claim 7, wherein the bearing device is configured for a longitudinal movement of the armrest, so that the armrest-side locking means and the body-side locking mechanism can be brought into engagement and can be disengaged by means of longitudinal movement of the armrest with a component perpendicular to the adjustment path.

12. Armrest subassembly according to claim 11, wherein the armrest is movable longitudinally along a direction essentially extending along the horizontal transverse axis of the vehicle when the armrest is installed in a motor vehicle.

13. Armrest subassembly according to claim 2, wherein the armrest is coupled to at least one driver which is guided movably along the adjustment path on the guide device, wherein the armrest travels along with the at least one driver.

14. Armrest subassembly according to claim 1, wherein the armrest-side locking means are formed by at least one locking element configured to engage in a locking location of the body-side locking mechanism.

15. Armrest subassembly according to claim 14, wherein the at least one locking element is configured as a latching element.

16. Armrest subassembly according to claim 1, wherein the body-side locking mechanism comprises a plurality of locking locations arranged consecutively along the adjustment path, wherein the armrest-side locking means can be brought into engagement with the body-side locking mechanism at the locking locations.

17. Armrest subassembly according to claim 16, wherein the locking locations are configured as locking openings.

18. Armrest subassembly according to claim 16, wherein the locking locations are formed on a longitudinal toothing extending along the adjustment path.

19. Armrest subassembly according to claim 1, wherein the armrest-side locking means and the body-side locking mechanism are configured for infinitely variable locking of the armrest in any desired armrest position along the adjustment path.

20. Armrest subassembly according to claim 19, wherein the armrest-side locking means and the body-side locking mechanism are configured for locking of the armrest by clamping.

21. Armrest subassembly according to claim 19, wherein the armrest-side locking means and the body-side locking mechanism comprise mutually assigned wedge surfaces configured to be brought into engagement with each other for locking of the armrest.

22. Armrest subassembly according to claim 2, wherein the body-side locking mechanism is integrated in the guide device.

23. Armrest subassembly according to claim 22, wherein the body-side locking mechanism is integrally formed on at least one guide rail of the guide device.

24. Armrest subassembly according to claim 1, wherein at least one of the adjusting device and the locking device is arranged on an assembly carrier which can be equipped with vehicle components outside a motor vehicle door and can subsequently be installed together with the vehicle components arranged thereon in a motor vehicle door.

25. Armrest subassembly according to claim 24, wherein the guide device is integrally formed on the assembly carrier as a single piece.

26. Armrest subassembly according to claim 24, wherein the assembly carrier is made of plastic.

27. Armrest subassembly according to claim 1, wherein the armrest and at least parts of the adjusting device are arranged on both sides of an inside door lining of a motor vehicle door, and wherein at least one slot extending along the adjustment path and through which the armrest is operatively connected to the adjusting device is provided in the inside door lining.

28. Armrest subassembly according to claim 27, wherein a covering element for covering the slot is provided on a driver.

29. Armrest subassembly according to claim 1, wherein the armrest has a door-pulling-shut handle.

30. Armrest subassembly according to claim 29, wherein the armrest is pivotable about an axis which extends with respect to the door-pulling-shut handle in such a manner that the locking device is not unlocked by tensile forces acting on the door-pulling-shut handle in order to close a motor vehicle door provided with the armrest subassembly.

31. Armrest subassembly according to claim 1, wherein the armrest is movable along the adjustment path by manual application of force in order to set the armrest position.

32. Armrest subassembly according to claim 27, wherein means are provided in order to position the armrest at a defined distance from the inside door lining.

33. Armrest subassembly according to claim 32, wherein the means for positioning the armrest at a defined distance from the inside door lining comprise a coupling element, wherein the armrest is coupled to the driver with the coupling element and configured to travel, with the driver and is positioned with respect to the driver, and wherein the means for positioning the armrest comprise at least one further element configured to operatively connect the driver to the inside door lining.

34. Armrest subassembly according to claim 33, wherein the further element is formed by the covering element.

35. Armrest subassembly according to claim 33, wherein the further element is guided in a guide extending along the adjustment path of the inside door lining.

36. Armrest subassembly according to claim 27, wherein the driver is arranged on that side of the inside door lining facing away from the armrest.

37. Armrest subassembly for a motor vehicle configured for arrangement on the interior side of a motor vehicle body, the armrest subassembly comprising:

an armrest having an arm support for supporting the arm of a motor vehicle occupant;

an adjusting device configured to set the position of the armrest along an adjustment path;

a locking device configured to lock the armrest in a set armrest position;

a bearing device;

armrest-side locking means of the locking device configured to be brought into engagement with an associated body-side locking mechanism to lock the armrest and configured to be disengaged from the body-side locking mechanism to unlock the armrest;

wherein the armrest-side locking means are coupled to the armrest in such a manner that the armrest-side locking means are configured to be brought into engagement with and configured to be disengaged from the body-side locking mechanism by a movement of the armrest with a component perpendicular to the adjustment path;

wherein the armrest is mounted with the bearing device, and wherein the armrest is movable with a component transverse to the adjustment path in order to bring the armrest-side locking means and the body-side locking mechanism into engagement and to disengage the armrest-side locking means and the body-side locking mechanism;

wherein the bearing device is configured for a longitudinal movement of the armrest, so that the armrest-side locking means and the body-side locking mechanism can be brought into engagement and can be disengaged by means of longitudinal movement of the armrest with a component perpendicular to the adjustment path; and wherein the armrest is movable longitudinally along a direction extending essentially along the longitudinal axis of the vehicle when the armrest is installed in a motor vehicle.

38. Armrest subassembly according to claim 37, wherein the armrest is elastically prestressed with a component transverse to the adjustment path in such a manner that the armrest-side locking means engage in the body-side locking mechanism under the effect of the elastic prestress.

39. Armrest subassembly for a motor vehicle configured for arrangement on the interior side of a motor vehicle body, the armrest subassembly comprising:

an armrest having an arm support for supporting the arm of a motor vehicle occupant;

an adjusting device configured to set the position of the armrest along an adjustment path;

a locking device configured to lock the armrest in a set armrest position;

armrest-side locking means of the locking device configured to be brought into engagement with an associated body-side locking mechanism to lock the armrest and configured to be disengaged from the body-side locking mechanism to unlock the armrest;

wherein the armrest-side locking means are coupled to the armrest in such a manner that the armrest-side locking means are configured to be brought into engagement with and configured to be disengaged from the body-side locking mechanism by a movement of the armrest with a component perpendicular to the adjustment path;

wherein the adjusting device comprises a guide device on which the armrest is guided movably along the adjustment path;

at least two drivers spaced apart from each other transversely to the adjustment path and guided on the guide device; and wherein the armrest is coupled to at least one of the drivers which is guided movably along the adjustment path on the guide device, wherein the armrest travels along with the at least one driver.

40. Armrest subassembly for a motor vehicle configured for arrangement on the interior side of a motor vehicle body, the armrest subassembly comprising:

an armrest having an arm support for supporting the arm of a motor vehicle occupant;

an adjusting device configured to set the position of the armrest along an adjustment path;

a locking device configured to lock the armrest in a set armrest position;

armrest-side locking means of the locking device configured to be brought into engagement with an associated body-side locking mechanism to lock the armrest and configured to be disengaged from the body-side locking mechanism to unlock the armrest;

wherein the armrest-side locking means are coupled to the armrest in such a manner that the armrest-side locking means are configured to be brought into engagement with and configured to be disengaged from the body-side locking mechanism by a movement of the armrest with a component perpendicular to the adjustment path;

wherein the adjusting device comprises a guide device on which the armrest is guided movably along the adjustment path;

wherein the armrest is coupled to at least one driver which is guided movably along the adjustment path on the guide device, wherein the armrest travels along with the at least one driver; and wherein the armrest is coupled to the at least one driver via a coupling element mounted on the driver with limited movability with a component perpendicular to the adjustment path.

41. Armrest subassembly according to claim 40, wherein the coupling element is mounted on the driver with limited pivotability.

42. Armrest subassembly according to claim 40, wherein the coupling element is mounted on the driver with limited longitudinal movability.

43. Armrest subassembly according to claim 40, wherein the armrest is connected fixedly to the at least one coupling element.

44. Armrest subassembly according to claim 43, wherein the armrest is connected in an interlocking manner to the coupling element.

45. Armrest subassembly according to claim 44, wherein the armrest is connected to the coupling element via a plug-in connection.

46. Armrest subassembly according to claim 44, wherein the armrest is connected to the coupling element via at least one of a latching connection and a clip connection.

47. Armrest subassembly according to claim 40, wherein the armrest-side locking means are provided on the coupling element and configured to be brought into engagement with and configured to be disengaged from the locking mechanism by movement of the coupling element relative to the driver.

48. Armrest subassembly according to claim 47, wherein locking-device components are provided on the coupling element and on the associated guide element for permitting infinitely variable locking of the armrest in any desired armrest position along the adjustment path.

* * * * *